(12) United States Patent
Yamazaki et al.

(10) Patent No.: US 9,625,764 B2
(45) Date of Patent: Apr. 18, 2017

(54) DISPLAY DEVICE AND ELECTRONIC DEVICE

(71) Applicant: Semiconductor Energy Laboratory Co., Ltd., Atsugi-shi, Kanagawa-ken (JP)

(72) Inventors: Shunpei Yamazaki, Setagaya (JP);
Yoshiharu Hirakata, Ebina (JP);
Takeshi Nishi, Atsugi (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 255 days.

(21) Appl. No.: 13/965,239

(22) Filed: Aug. 13, 2013

(65) Prior Publication Data

US 2014/0063432 A1 Mar. 6, 2014

(30) Foreign Application Priority Data

Aug. 28, 2012 (JP) .................................. 2012-188060

(51) Int. Cl.
*G02F 1/1339* (2006.01)
*G02F 1/01* (2006.01)
*G02F 1/1341* (2006.01)

(52) U.S. Cl.
CPC .......... *G02F 1/1339* (2013.01); *G02F 1/0107* (2013.01); *G02F 1/1341* (2013.01)

(58) Field of Classification Search
CPC ..... G02F 1/1339; G02F 1/0107; G02F 1/1341
See application file for complete search history.

(56) References Cited

U.S. PATENT DOCUMENTS

| 4,357,557 A | 11/1982 | Inohara et al. |
| 4,640,583 A | 2/1987 | Hoshikawa et al. |
| 5,731,856 A | 3/1998 | Kim et al. |
| 5,744,864 A | 4/1998 | Cillessen et al. |

(Continued)

FOREIGN PATENT DOCUMENTS

| EP | 1737044 A | 12/2006 |
| EP | 2226847 A | 9/2010 |

(Continued)

OTHER PUBLICATIONS

Fortunato.E et al., "Wide-Bandgap High-Mobility ZnO Thin-Film Transistors Produced At Room Temperature,", Appl. Phys. Lett. (Applied Physics Letters), Sep. 27, 2004, vol. 85, No. 13, pp. 2541-2543.

(Continued)

*Primary Examiner* — Nathanael R Briggs
*Assistant Examiner* — Alexander Gross
(74) *Attorney, Agent, or Firm* — Robinson Intellectual Property Law Office; Eric J. Robinson

(57) ABSTRACT

A display device having high reliability is provided. A frame of a display device is narrowed. A display device such as a liquid crystal display device includes a first substrate, a second substrate overlapping with the first substrate, a liquid crystal layer between the first substrate and the second substrate, a first sealant surrounding the liquid crystal layer between the first substrate and the second substrate, and a second sealant surrounding the first sealant, closing a gap between the first substrate and the second substrate, and extending to at least a side surface of the second substrate.

20 Claims, 13 Drawing Sheets

(56) References Cited

U.S. PATENT DOCUMENTS

| | | | |
|---|---|---|---|
| 6,219,127 B1* | 4/2001 | Hirakata | G02F 1/1341 349/153 |
| 6,294,274 B1 | 9/2001 | Kawazoe et al. | |
| 6,563,174 B2 | 5/2003 | Kawasaki et al. | |
| 6,580,094 B1 | 6/2003 | Yamazaki et al. | |
| 6,605,826 B2 | 8/2003 | Yamazaki et al. | |
| 6,727,522 B1 | 4/2004 | Kawasaki et al. | |
| 6,809,343 B2 | 10/2004 | Yamazaki et al. | |
| 6,864,943 B2 | 3/2005 | Hirakata et al. | |
| 7,049,190 B2 | 5/2006 | Takeda et al. | |
| 7,061,014 B2 | 6/2006 | Hosono et al. | |
| 7,064,346 B2 | 6/2006 | Kawasaki et al. | |
| 7,105,868 B2 | 9/2006 | Nause et al. | |
| 7,189,999 B2 | 3/2007 | Yamazaki et al. | |
| 7,199,855 B2 | 4/2007 | Tashiro et al. | |
| 7,211,825 B2 | 5/2007 | Shih et al. | |
| 7,230,669 B1 | 6/2007 | Tashiro et al. | |
| 7,279,752 B2 | 10/2007 | Yamazaki et al. | |
| 7,282,782 B2 | 10/2007 | Hoffman et al. | |
| 7,283,185 B2 | 10/2007 | Hirakata et al. | |
| 7,297,977 B2 | 11/2007 | Hoffman et al. | |
| 7,323,356 B2 | 1/2008 | Hosono et al. | |
| 7,369,212 B2 | 5/2008 | Tashiro et al. | |
| 7,372,535 B2 | 5/2008 | Tashiro et al. | |
| 7,385,224 B2 | 6/2008 | Ishii et al. | |
| 7,402,506 B2 | 7/2008 | Levy et al. | |
| 7,411,209 B2 | 8/2008 | Endo et al. | |
| 7,453,065 B2 | 11/2008 | Saito et al. | |
| 7,453,087 B2 | 11/2008 | Iwasaki | |
| 7,453,089 B2 | 11/2008 | Yamazaki et al. | |
| 7,462,862 B2 | 12/2008 | Hoffman et al. | |
| 7,468,304 B2 | 12/2008 | Kaji et al. | |
| 7,501,293 B2 | 3/2009 | Ito et al. | |
| 7,579,203 B2 | 8/2009 | Yamazaki et al. | |
| 7,674,650 B2 | 3/2010 | Akimoto et al. | |
| 7,732,819 B2 | 6/2010 | Akimoto et al. | |
| 7,733,457 B2 | 6/2010 | Tashiro et al. | |
| 7,738,062 B2 | 6/2010 | Tashiro et al. | |
| 7,738,073 B2 | 6/2010 | Inoue et al. | |
| 7,897,003 B2 | 3/2011 | Tashiro et al. | |
| 8,017,945 B2 | 9/2011 | Yamazaki et al. | |
| 8,106,407 B2 | 1/2012 | Yamazaki et al. | |
| 8,289,481 B2 | 10/2012 | Tashiro et al. | |
| 8,432,502 B2 | 4/2013 | Yamazaki et al. | |
| 8,497,516 B2 | 7/2013 | Yamazaki et al. | |
| 8,648,345 B2 | 2/2014 | Yamazaki et al. | |
| 2001/0046027 A1 | 11/2001 | Tai et al. | |
| 2002/0024096 A1 | 2/2002 | Yamazaki et al. | |
| 2002/0056838 A1 | 5/2002 | Ogawa | |
| 2002/0132454 A1 | 9/2002 | Ohtsu et al. | |
| 2002/0196393 A1 | 12/2002 | Tashiro et al. | |
| 2003/0189401 A1 | 10/2003 | Kido et al. | |
| 2003/0201448 A1 | 10/2003 | Yamazaki et al. | |
| 2003/0218222 A1 | 11/2003 | Wager et al. | |
| 2004/0012747 A1 | 1/2004 | Yamazaki et al. | |
| 2004/0038446 A1 | 2/2004 | Takeda et al. | |
| 2004/0127038 A1 | 7/2004 | Carcia et al. | |
| 2004/0195967 A1* | 10/2004 | Padiyath | B32B 27/08 313/512 |
| 2005/0017302 A1 | 1/2005 | Hoffman | |
| 2005/0056832 A1 | 3/2005 | Yamazaki et al. | |
| 2005/0199959 A1 | 9/2005 | Chiang et al. | |
| 2006/0035452 A1 | 2/2006 | Carcia et al. | |
| 2006/0043377 A1 | 3/2006 | Hoffman et al. | |
| 2006/0091793 A1 | 5/2006 | Baude et al. | |
| 2006/0108529 A1 | 5/2006 | Saito et al. | |
| 2006/0108636 A1 | 5/2006 | Sano et al. | |
| 2006/0110867 A1 | 5/2006 | Yabuta et al. | |
| 2006/0113536 A1 | 6/2006 | Kumomi et al. | |
| 2006/0113539 A1 | 6/2006 | Sano et al. | |
| 2006/0113549 A1 | 6/2006 | Den et al. | |
| 2006/0113565 A1 | 6/2006 | Abe et al. | |
| 2006/0169973 A1 | 8/2006 | Isa et al. | |
| 2006/0170111 A1 | 8/2006 | Isa et al. | |
| 2006/0176439 A1 | 8/2006 | Tashiro et al. | |
| 2006/0197092 A1 | 9/2006 | Hoffman et al. | |
| 2006/0208977 A1 | 9/2006 | Kimura | |
| 2006/0228974 A1 | 10/2006 | Thelss et al. | |
| 2006/0231882 A1 | 10/2006 | Kim et al. | |
| 2006/0238135 A1 | 10/2006 | Kimura | |
| 2006/0244107 A1 | 11/2006 | Sugihara et al. | |
| 2006/0284171 A1 | 12/2006 | Levy et al. | |
| 2006/0284172 A1 | 12/2006 | Ishii | |
| 2006/0292777 A1 | 12/2006 | Dunbar | |
| 2007/0013862 A1 | 1/2007 | Tashiro et al. | |
| 2007/0024187 A1 | 2/2007 | Shin et al. | |
| 2007/0046191 A1 | 3/2007 | Saito | |
| 2007/0052025 A1 | 3/2007 | Yabuta | |
| 2007/0054507 A1 | 3/2007 | Kaji et al. | |
| 2007/0072439 A1 | 3/2007 | Akimoto et al. | |
| 2007/0075316 A1 | 4/2007 | Yamazaki et al. | |
| 2007/0090365 A1 | 4/2007 | Hayashi et al. | |
| 2007/0108446 A1 | 5/2007 | Akimoto | |
| 2007/0152217 A1 | 7/2007 | Lai et al. | |
| 2007/0170839 A1 | 7/2007 | Choi et al. | |
| 2007/0170860 A1 | 7/2007 | Choi et al. | |
| 2007/0172591 A1 | 7/2007 | Seo et al. | |
| 2007/0172971 A1 | 7/2007 | Boroson | |
| 2007/0187678 A1 | 8/2007 | Hirao et al. | |
| 2007/0187760 A1 | 8/2007 | Furuta et al. | |
| 2007/0194304 A1* | 8/2007 | Zu | H01L 51/5237 257/40 |
| 2007/0194379 A1 | 8/2007 | Hosono et al. | |
| 2007/0211197 A1 | 9/2007 | Tashiro et al. | |
| 2007/0252928 A1 | 11/2007 | Ito et al. | |
| 2007/0272922 A1 | 11/2007 | Kim et al. | |
| 2007/0287296 A1 | 12/2007 | Chang | |
| 2008/0006877 A1 | 1/2008 | Mardilovich et al. | |
| 2008/0012479 A1* | 1/2008 | Yoo | H01L 27/3251 313/505 |
| 2008/0029765 A1 | 2/2008 | Yamazaki et al. | |
| 2008/0038882 A1 | 2/2008 | Takechi et al. | |
| 2008/0038929 A1 | 2/2008 | Chang | |
| 2008/0050595 A1 | 2/2008 | Nakagawara et al. | |
| 2008/0073653 A1 | 3/2008 | Iwasaki | |
| 2008/0083950 A1 | 4/2008 | Pan et al. | |
| 2008/0106191 A1 | 5/2008 | Kawase | |
| 2008/0123042 A1 | 5/2008 | Tashiro et al. | |
| 2008/0128689 A1 | 6/2008 | Lee et al. | |
| 2008/0129195 A1 | 6/2008 | Ishizaki et al. | |
| 2008/0137027 A1 | 6/2008 | Tashiro et al. | |
| 2008/0166834 A1 | 7/2008 | Kim et al. | |
| 2008/0182358 A1 | 7/2008 | Cowdery-Corvan et al. | |
| 2008/0188157 A1 | 8/2008 | Tashiro et al. | |
| 2008/0203312 A1* | 8/2008 | Kudo | G01T 1/2002 250/370.11 |
| 2008/0224133 A1 | 9/2008 | Park et al. | |
| 2008/0254569 A1 | 10/2008 | Hoffman et al. | |
| 2008/0258139 A1 | 10/2008 | Ito et al. | |
| 2008/0258140 A1 | 10/2008 | Lee et al. | |
| 2008/0258141 A1 | 10/2008 | Park et al. | |
| 2008/0258143 A1 | 10/2008 | Kim et al. | |
| 2008/0296568 A1 | 12/2008 | Ryu et al. | |
| 2009/0004772 A1 | 1/2009 | Jinbo et al. | |
| 2009/0068773 A1 | 3/2009 | Lai et al. | |
| 2009/0073325 A1 | 3/2009 | Kuwabara et al. | |
| 2009/0114910 A1 | 5/2009 | Chang | |
| 2009/0134939 A1 | 5/2009 | Sakakura et al. | |
| 2009/0149224 A1 | 6/2009 | Yamazaki et al. | |
| 2009/0152506 A1 | 6/2009 | Umeda et al. | |
| 2009/0152541 A1 | 6/2009 | Maekawa et al. | |
| 2009/0278122 A1 | 11/2009 | Hosono et al. | |
| 2009/0280600 A1 | 11/2009 | Hosono et al. | |
| 2009/0302760 A1 | 12/2009 | Tchakarov et al. | |
| 2009/0323162 A1* | 12/2009 | Fanton | G02F 1/1533 359/275 |
| 2010/0065844 A1 | 3/2010 | Tokunaga | |
| 2010/0092800 A1 | 4/2010 | Itagaki et al. | |
| 2010/0109002 A1 | 5/2010 | Itagaki et al. | |
| 2010/0134746 A1 | 6/2010 | Tashiro et al. | |
| 2010/0134747 A1 | 6/2010 | Tashiro et al. | |
| 2010/0321758 A1* | 12/2010 | Bugno et al. | 359/267 |
| 2011/0012112 A1 | 1/2011 | Yamazaki et al. | |
| 2011/0165918 A1 | 7/2011 | Yamazaki et al. | |

(56) References Cited

U.S. PATENT DOCUMENTS

| | | | |
|---|---|---|---|
| 2011/0222013 A1* | 9/2011 | Kawanishi et al. | 349/153 |
| 2012/0061718 A1 | 3/2012 | Yamazaki et al. | |
| 2012/0126234 A1 | 5/2012 | Yamazaki et al. | |
| 2012/0161603 A1 | 6/2012 | Van Montfort et al. | |
| 2012/0194756 A1* | 8/2012 | Hayakawa | G02F 1/136 349/43 |
| 2012/0241802 A1 | 9/2012 | Philippens et al. | |
| 2012/0300151 A1 | 11/2012 | Yamazaki et al. | |
| 2013/0001582 A1 | 1/2013 | Kadono et al. | |
| 2013/0012272 A1 | 1/2013 | Yamazaki et al. | |
| 2013/0048967 A1 | 2/2013 | Nishido et al. | |
| 2014/0061612 A1 | 3/2014 | Yamazaki et al. | |
| 2014/0065430 A1 | 3/2014 | Yamazaki et al. | |

FOREIGN PATENT DOCUMENTS

| | | |
|---|---|---|
| JP | S60-026321 | 2/1985 |
| JP | S60-101520 | 6/1985 |
| JP | 60-198861 A | 10/1985 |
| JP | S6291623 U | 6/1987 |
| JP | 63-210022 A | 8/1988 |
| JP | 63-210023 A | 8/1988 |
| JP | 63-210024 A | 8/1988 |
| JP | 63-215519 A | 9/1988 |
| JP | 63-239117 A | 10/1988 |
| JP | 63-265818 A | 11/1988 |
| JP | S6454420 | 3/1989 |
| JP | H055890 | 1/1993 |
| JP | 05-251705 A | 9/1993 |
| JP | 08-264794 A | 10/1996 |
| JP | 10-172757 | 6/1998 |
| JP | H10-161136 | 6/1998 |
| JP | 11-505377 | 5/1999 |
| JP | 2000-044236 A | 2/2000 |
| JP | 2000-150900 A | 5/2000 |
| JP | 2001-222017 | 8/2001 |
| JP | 2002-076356 A | 3/2002 |
| JP | 2002-289859 A | 10/2002 |
| JP | 2003-086000 A | 3/2003 |
| JP | 2003-086808 A | 3/2003 |
| JP | 2004-103957 A | 4/2004 |
| JP | 2004-273614 A | 9/2004 |
| JP | 2004-273732 A | 9/2004 |
| JP | 2007-123861 | 5/2007 |
| JP | 2007-165861 | 6/2007 |
| JP | 2011-018479 | 1/2011 |
| JP | 2011-044699 | 3/2011 |
| TW | 200733792 | 9/2007 |
| TW | 201207533 | 2/2012 |
| WO | WO-2004/114391 | 12/2004 |
| WO | WO-2007/087157 | 8/2007 |
| WO | WO-2011/012371 | 2/2011 |
| WO | WO-2011/068106 | 6/2011 |

OTHER PUBLICATIONS

Dembo.H et al., "RFCPUS on Glass and Plastic Substrates Fabricated by TFT Transfer Technology,", IEDM 05: Technical Digest of International Electron Devices Meeting, Dec. 5, 2005, pp. 1067-1069.

Ikeda.T et al., "Full-Functional System Liquid Crystal Display Using Cg-Silicon Technology,", SID Digest '04 : SID International Symposium Digest of Technical Papers, 2004, vol. 35, pp. 860-863.

Nomura.K et al., "Room-Temperature Fabrication of Transparent Flexible Thin-Film Transistors Using Amorphous Oxide Semiconductors,", Nature, Nov. 25, 2004, vol. 432, pp. 488-492.

Park.J et al., "Improvements in the Device Characteristics of Amorphous Indium Gallium Zinc Oxide Thin Film Transistors by Ar Plasma Treatment,", Appl. Phys. Lett. (Applied Physics Letters), Jun. 26, 2007, vol. 90, No. 26, pp. 262106-1-262106-3.

Takahashi.M et al., "Theoretical Analysis of IGZO Transparent Amorphous Oxide Semiconductor,", IDW '08 : Proceedings of the 15th International Display Workshops, Dec. 3, 2008, pp. 1637-1640.

Hayashi.R et al., "42.1: Invited Paper: Improved Amorphous In—Ga—Zn—O TFTs,", SID Digest '08: SID International Symposium Digest of Technical Papers, May 20, 2008, vol. 39, pp. 621-624.

Prins.M et al., "A Ferroelectric Transparent Thin-Film Transistor,", Appl. Phys. Lett. (Applied Physics Letters), Jun. 17, 1996, vol. 68, No. 25, pp. 3650-3652.

Nakamura.M et al., "The phase relations in the $In_2O_3$—$Ga_2ZnO_4$—ZnO system at 1350° C.,", Journal of Solid State Chemistry, Aug. 1, 1991, vol. 93, No. 2, pp. 298-315.

Kimizuka.N et al., "Syntheses and Single-Crystal Data of Homologous Compounds, $In_2O_3(ZnO)_m$ (m=3, 4, and 5), $InGaO_3(ZnO)_3$, and $Ga_2O_3(ZnO)_m$ (m=7, 8, 9, and 16) in the $In_2O_3$—$ZnGa_2O_4$—ZnO System", Journal of Solid State Chemistry, Apr. 1, 1995, vol. 116, No. 1, pp. 170-178.

Nomura.K et al., "Thin-Film Transistor Fabricated in Single-Crystalline Transparent Oxide Semiconductor,", Science, May 23, 2003, vol. 300, No. 5623, pp. 1269-1272.

Masuda.S et al., "Transparent thin film transistors using ZnO as an active channel layer and their electrical properties,", J. Appl. Phys. (Journal of Applied Physics), Feb. 1, 2003, vol. 93, No. 3, pp. 1624-1630.

Asakuma.N et al., "Crystallization and Reduction of Sol-Gel-Derived Zinc Oxide Films by Irradiation With Ultraviolet Lamp,", Journal of Sol-Gel Science and Technology, 2003, vol. 26, pp. 181-184.

Osada.T et al., "15.2: Development of Driver-Integrated Panel using Amorphous In—Ga—Zn-Oxide TFT,", SID Digest '09 : SID International Symposium Digest of Technical Papers, May 31, 2009, pp. 184-187.

Nomura.K et al., "Carrier transport in transparent oxide semiconductor with intrinsic structural randomness probed using single-crystalline $InGaO_3(ZnO)_5$ films,", Appl. Phys. Lett. (Applied Physics Letters), Sep. 13, 2004, vol. 85, No. 11, pp. 1993-1995.

Li.C et al., "Modulated Structures of Homologous Compounds $InMO_3(ZnO)_m$ (M=In,Ga; m=Integer) Described by Four-Dimensional Superspace Group,", Journal of Solid State Chemistry, 1998, vol. 139, pp. 347-355.

Son.K et al., "42.4L: Late-News Paper: 4 Inch QVGA AMOLED Driven by the Threshold Voltage Controlled Amorphous GIZO ($Ga_2O_3$—$In_2O_3$—ZnO) TFT,", SID Digest '08 : SID International Symposium Digest of Technical Papers, May 20, 2008, vol. 39, pp. 633-636.

Lee.J et al., "World's Largest (15-Inch) XGA AMLCD Panel Using IGZO Oxide TFT,", SID Digest '08 : SID International Symposium Digest of Technical Papers, May 20, 2008, vol. 39, pp. 625-628.

Nowatari.H et al., "60.2: Intermediate Connector With Suppressed Voltage Loss for White Tandem OLEDs,", SID Digest '09 : SID International Symposium Digest of Technical Papers, May 31, 2009, vol. 40, pp. 899-902.

Kanno.H et al., "White Stacked Electrophosphorecent Organic Light-Emitting Devices Employing $MoO_3$ As a Charge-Generation Layer,", Adv. Mater. (Advanced Materials), 2006, vol. 18, No. 3, pp. 339-342.

Tsuda.K et al., "Ultra Low Power Consumption Technologies for Mobile TFT-LCDs ,", IDW '02: Proceedings of the 9th International Display Workshops, Dec. 4, 2002, pp. 295-298.

Van de Walle.C, "Hydrogen as a Cause of Doping in Zinc Oxide,", Phys. Rev. Lett. (Physical Review Letters), Jul. 31, 2000, vol. 85, No. 5, pp. 1012-1015.

Fung.T et al., "2-D Numerical Simulation of High Performance Amorphous In—Ga—Zn—O TFTs for Flat Panel Displays,", AM-FPD '08 Digest of Technical Papers, Jul. 2, 2008, pp. 251-252, The Japan Society of Applied Physics.

Jeong.J et al., "3.1: Distinguished Paper: 12.1-Inch WXGA AMOLED Display Driven by Indium-Gallium-Zinc Oxide TFTs Array,", SID Digest '08 : SID International Symposium Digest of Technical Papers, May 20, 2008, vol. 39, No. 1, pp. 1-4.

Park.J et al., "High performance amorphous oxide thin film transistors with self-aligned top-gate structure,", IEDM 09: Technical Digest of International Electron Devices Meeting, Dec. 7, 2009, pp. 191-194.

(56) References Cited

OTHER PUBLICATIONS

Kurokawa.Y et al., "UHF RFCPUS on Flexible and Glass Substrates for Secure RFID Systems,", Journal of Solid-State Circuits, 2008, vol. 43, No. 1, pp. 292-299.

Ohara.H et al., "Amorphous In—Ga—Zn-Oxide TFTs with Suppressed Variation for 4.0 inch QVGA AMOLED Display,", AM-FPD '09 Digest of Technical Papers, Jul. 1, 2009, pp. 227-230, The Japan Society of Applied Physics.

Coates.D et al., "Optical Studies of the Amorphous Liquid-Cholesteric Liquid Crystal Transition:The "Blue Phase",", Physics Letters, Sep. 10, 1973, vol. 45A, No. 2, pp. 115-116.

Cho.D et al., "21.2:Al and Sn-Doped Zinc Indium Oxide Thin Film Transistors for AMOLED Back-Plane,", SID Digest '09 : SID International Symposium Digest of Technical Papers, May 31, 2009, pp. 280-283.

Lee.M et al., "15.4:Excellent Performance of Indium-Oxide-Based Thin-Film Transistors by DC Sputtering,", SID Digest '09 : SID International Symposium Digest of Technical Papers, May 31, 2009, pp. 191-193.

Jin.D et al., "65.2:Distinguished Paper:World-Largest (6.5") Flexible Full Color Top Emission AMOLED Display on Plastic Film and its Bending Properties,", SID Digest '09 : SID International Symposium Digest of Technical Papers, May 31, 2009, pp. 983-985.

Sakata.J et al., "Development of 4.0-In. AMOLED Display With Driver Circuit Using Amorphous In—Ga—Zn-Oxide TFTs,", IDW'09 : Proceedings of the 16th International Display Workshops, 2009, pp. 689-692.

Park.J et al., "Amorphous Indium-Gallium-Zinc Oxide TFTs and Their Application for Large Size AMOLED,", AM-FPD '08 Digest of Technical Papers, Jul. 2, 2008, pp. 275-278.

Park.S et al., "Challenge to Future Displays: Transparent AM-OLED Driven by Peald Grown ZnO TFT,", IMID '07 Digest, 2007, pp. 1249-1252.

Godo.H et al., "Temperature Dependence of Characteristics and Electronic Structure for Amorphous In—Ga—Zn-Oxide TFT,", AM-FPD '09 Digest of Technical Papers, Jul. 1, 2009, pp. 41-44.

Osada.T et al., "Development of Driver-Integrated Panel Using Amorphous In—Ga—Zn-Oxide TFT,", AM-FPD '09 Digest of Technical Papers, Jul. 1, 2009, pp. 33-36.

Hirao.T et al., "Novel Top-Gate Zinc Oxide Thin-Film Transistors (ZnO TFTs) for AMLCDs,", Journal of the SID, 2007, vol. 15, No. 1, pp. 17-22.

Hosono.H, "68.3:Invited Paper:Transparent Amorphous Oxide Semiconductors for High Performance TFT,", SID Digest '07 : SID International Symposium Digest of Technical Papers, 2007, vol. 38, pp. 1830-1833.

Godo.H et al., "P-9:Numerical Analysis on Temperature Dependence of Characteristics of Amorphous In—Ga—Zn-Oxide TFT,", SID Digest '09 : SID International Symposium Digest of Technical Papers, May 31, 2009, pp. 1110-1112.

Ohara.H et al., "21.3:4.0 In. QVGA AMOLED Display Using In—Ga—Zn-Oxide TFTs With a Novel Passivation Layer,", SID Digest '09 : SID International Symposium Digest of Technical Papers, May 31, 2009, pp. 284-287.

Miyasaka.M, "SUFTLA Flexible Microelectronics on Their Way to Business,", SID Digest '07 : SID International Symposium Digest of Technical Papers, 2007, vol. 38, pp. 1673-1676.

Chern.H et al., "An Analytical Model for the Above-Threshold Characteristics of Polysilicon Thin-Film Transistors,", IEEE Transactions On Electron Devices, Jul. 1, 1995, vol. 42, No. 7, pp. 1240-1246.

Kikuchi.H et al., "39.1:Invited Paper:Optically Isotropic Nano-Structured Liquid Crystal Composites For Display Applications,", SID Digest '09 : SID International Symposium Digest of Technical Papers, May 31, 2009, pp. 578-581.

Asaoka.Y et al., "29.1 Polarizer-Free Reflective LCD Combined With Ultra Low-Power Driving Technology,", SID Digest '09 : SID International Symposium Digest of Technical Papers, May 31, 2009, pp. 395-398.

Lee.H et al., "Current Status of, Challenges to, and Perspective View of AM-OLED ,", IDW '06 : Proceedings of the 13th International Display Workshops, Dec. 7, 2006, pp. 663-666.

Kikuchi.H et al., "62.2:Invited Paper:Fast Electro-Optical Switching in Polymer-Stabilized Liquid Crystalline Blue Phases for Display Application,", SID Digest '07 : SID International Symposium Digest of Technical Papers, 2007, vol. 38, pp. 1737-1740.

Nakamura.M, "Synthesis of Homologous Compound with New Long-Period Structure,", NIRIM Newsletter, Mar. 1, 1995, vol. 150, pp. 1-4.

Kikuchi.H et al., "Polymer-Stabilized Liquid Crystal Blue Phases,", Nature Materials, Sep. 2, 2002, vol. 1, pp. 64-68.

Kimizuka.N et al., "Spinel,YbFe2O4, and Yb2Fe3O7 Types of Structures for Compounds in the In2O3 and Sc2O3—A2O3—Bo Systems [A; Fe, Ga, or Al; B: Mg, Mn, Fe, Ni, Cu, or Zn] at Temperatures Over 1000° C.,", Journal of Solid State Chemistry, 1985, vol. 60, pp. 382-384.

Kitzerow.H et al., "Observation of Blue Phases in Chiral Networks,", Liquid Crystals, 1993, vol. 14, No. 3, pp. 911-916.

Costello.M et al., "Electron Microscopy of a Cholesteric Liquid Crystal and Its Blue Phase,", Phys. Rev. A (Physical Review. A), May 1, 1984, vol. 29, No. 5, pp. 2957-2959.

Meiboom.S et al., "Theory of the Blue Phase of Cholesteric Liquid Crystals,", Phys. Rev. Lett. (Physical Review Letters), May 4, 1981, vol. 46, No. 18, pp. 1216-1219.

Park.Sang-Hee et al., "42.3: Transparent ZnO Thin Film Transistor for the Application of High Aperture Ratio Bottom Emission AM-OLED Display,", SID Digest '08 : SID International Symposium Digest of Technical Papers, May 20, 2008, vol. 39, pp. 629-632.

Orita.M et al., "Mechanism of Electrical Conductivity of Transparent InGaZnO4,", Phys. Rev. B (Physical Review. B), Jan. 15, 2000, vol. 61, No. 3, pp. 1811-1816.

Nomura.K et al., "Amorphous Oxide Semiconductors for High-Performance Flexible Thin-Film Transistors,", Jpn. J. Appl. Phys. (Japanese Journal of Applied Physics) , 2006, vol. 45, No. 5B, pp. 4303-4308.

Janotti.A et al., "Native Point Defects in ZnO,", Phys. Rev. B (Physical Review. B), Oct. 4, 2007, vol. 76, No. 16, pp. 165202-1-165202-22.

Park.J et al., "Electronic Transport Properties of Amorphous Indium-Gallium-Zinc Oxide Semiconductor Upon Exposure to Water,", Appl. Phys. Lett. (Applied Physics Letters) , 2008, vol. 92, pp. 072104-1-072104-3.

Hsieh.H et al., "P-29:Modeling of Amorphous Oxide Semiconductor Thin Film Transistors and Subgap Density of States,", SID Digest '08 : SID International Symposium Digest of Technical Papers, 2008, vol. 39, pp. 1277-1280.

Janotti.A et al., "Oxygen Vacancies in ZnO,", Appl. Phys. Lett. (Applied Physics Letters) , 2005, vol. 87, pp. 122102-1-122102-3.

Oba.F et al., "Defect energetics in ZnO: A hybrid Hartree-Fock density functional study,", Phys. Rev. B (Physical Review. B), 2008, vol. 77, pp. 245202-1-245202-6.

Orita.M et al., "Amorphous transparent conductive oxide InGaO3(ZnO)m (m<4):a Zn4s conductor,", Philosophical Magazine, 2001, vol. 81, No. 5, pp. 501-515.

Hosono.H et al., "Working hypothesis to explore novel wide band gap electrically conducting amorphous oxides and examples,", J. Non-Cryst. Solids (Journal of Non-Crystalline Solids), 1996, vol. 198-200, pp. 165-169.

Mo.Y et al., "Amorphous Oxide TFT Backplanes for Large Size AMOLED Displays,", IDW '08: Proceedings of the 6th International Display Workshops, Dec. 3, 2008, pp. 581-584.

Kim.S et al., "High-Performance oxide thin film transistors passivated by various gas plasmas,", 214th ECS Meeting, 2008, No. 2317, ECS.

Clark.S et al., "First Principles Methods Using CASTEP,", Zeitschrift fur Kristallographie, 2005, vol. 220, pp. 567-570.

Lany.S et al., "Dopability, Intrinsic Conductivity, and Nonstoichiometry of Transparent Conducting Oxides,", Phys. Rev. Lett. (Physical Review Letters), Jan. 26, 2007, vol. 98, pp. 045501-1-045501-4.

(56) References Cited

OTHER PUBLICATIONS

Park.J et al., "Dry etching of ZnO films and plasma-induced damage to optical properties,", J. Vac. Sci. Technol. B (Journal of Vacuum Science & Technology B), Mar. 1, 2003, vol. 21, No. 2, pp. 800-803.
Oh.M et al., "Improving the Gate Stability of ZnO Thin-Film Transistors With Aluminum Oxide Dielectric Layers,", J. Electrochem. Soc. (Journal of the Electrochemical Society), 2008, vol. 155, No. 12, pp. H1009-H1014.
Ueno.K et al., "Field-Effect Transistor on SrTiO3 With Sputtered Al2O3 Gate Insulator,", Appl. Phys. Lett. (Applied Physics Letters), Sep. 1, 2003, vol. 83, No. 9, pp. 1755-1757.
Taiwanese Office Action (Application No. 102129811) Dated Oct. 27, 2016.

\* cited by examiner

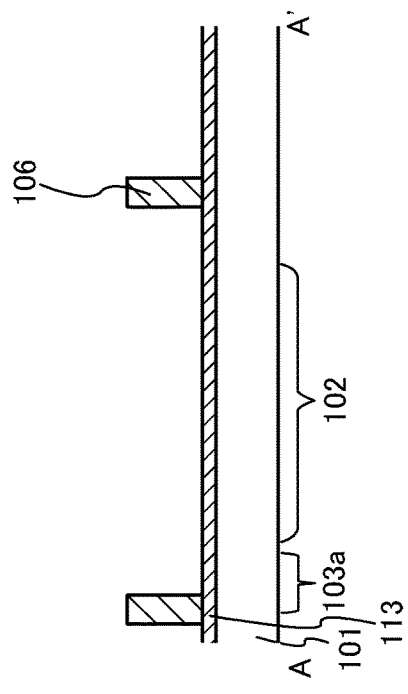
FIG. 6A2
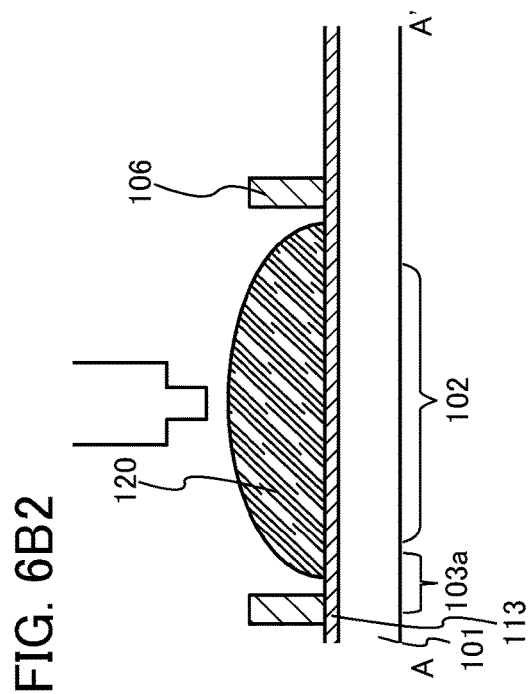
FIG. 6B2
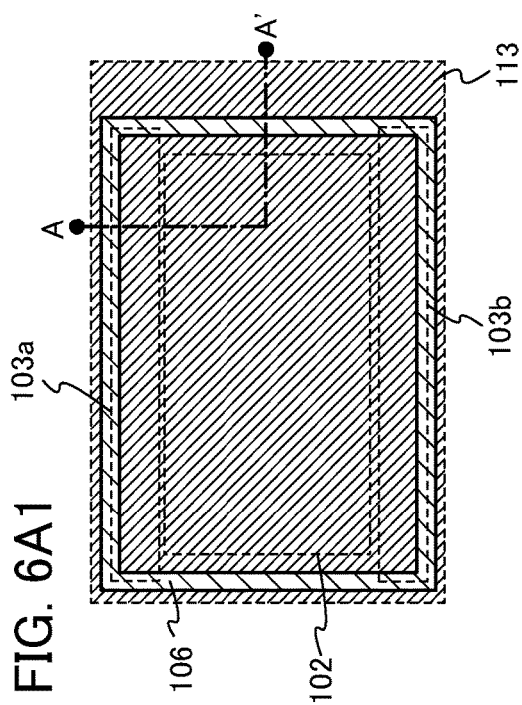
FIG. 6A1
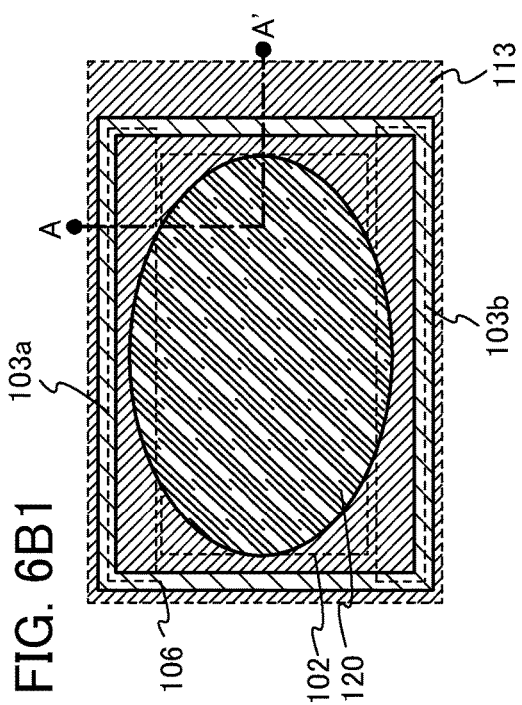
FIG. 6B1

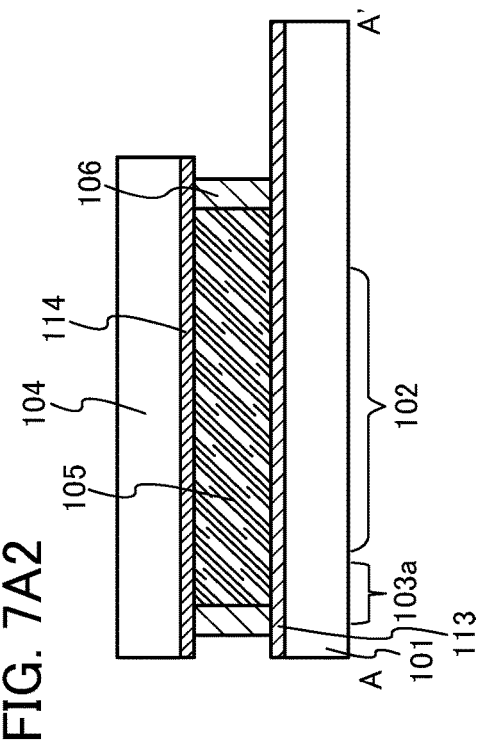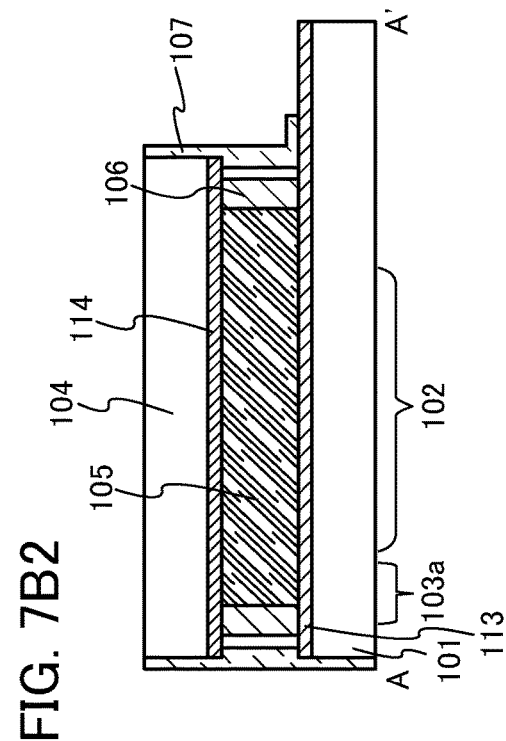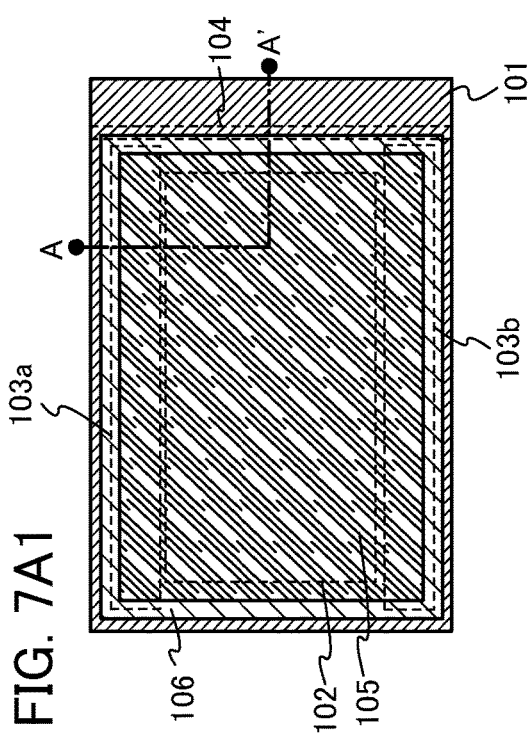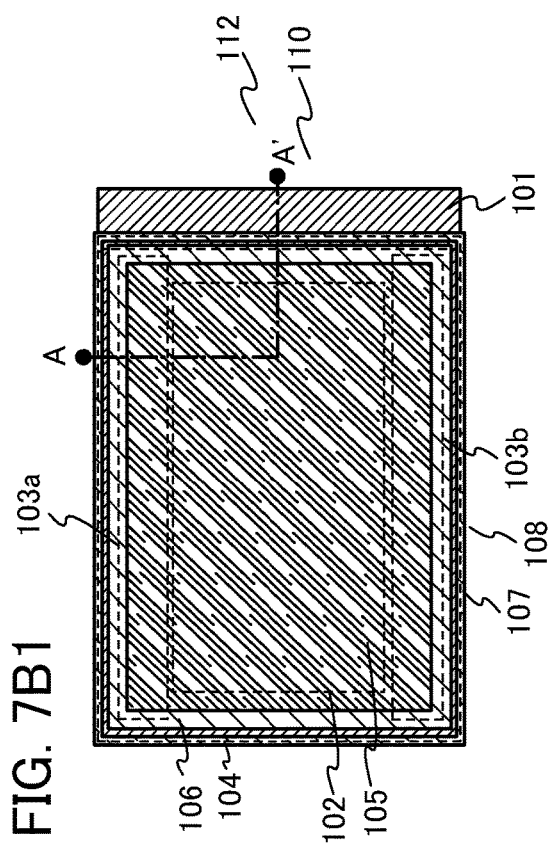

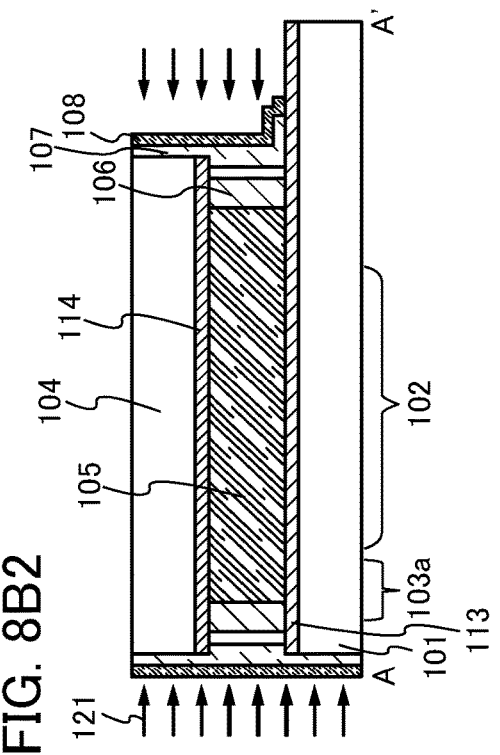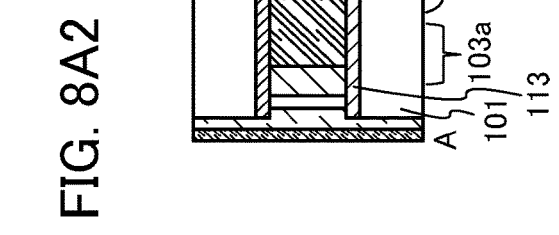

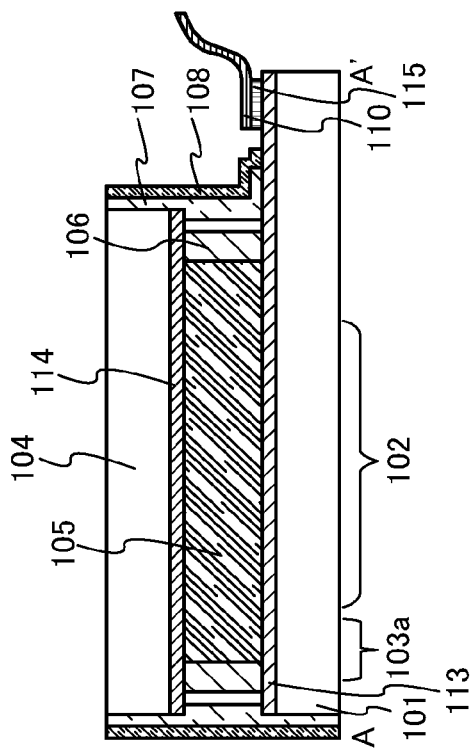
FIG. 9A2
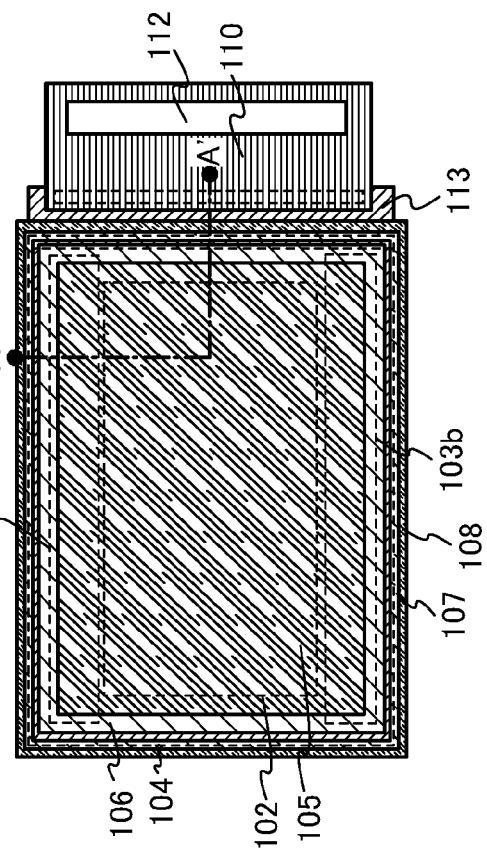
FIG. 9A1

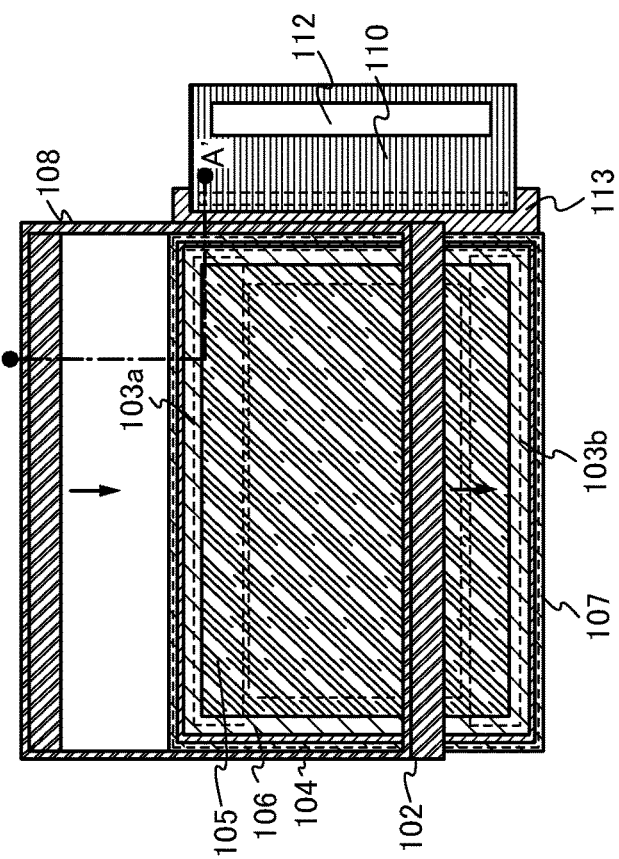
FIG. 10A1
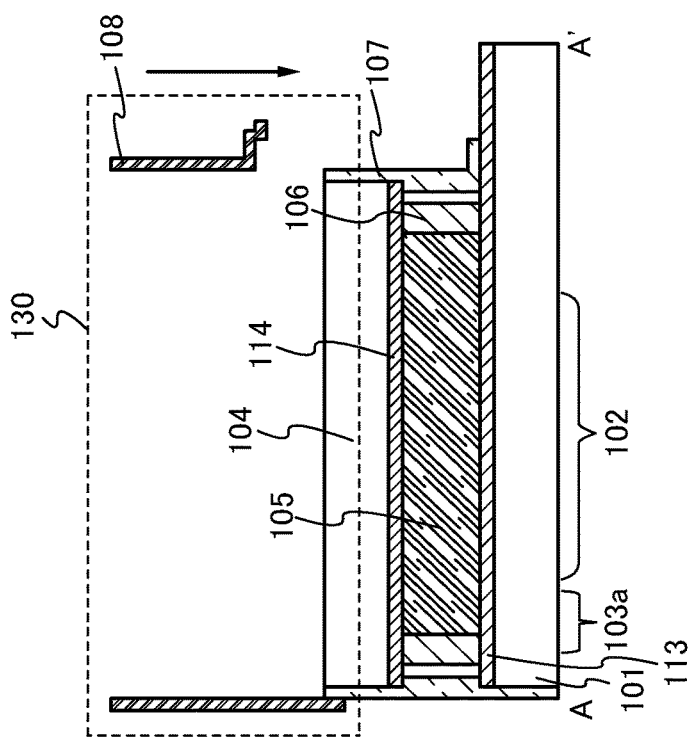
FIG. 10A2

DISPLAY DEVICE AND ELECTRONIC DEVICE

BACKGROUND OF THE INVENTION

1. Field of the Invention

One embodiment of the present invention relates to a display device. Further, one embodiment of the present invention relates to an electronic device.

2. Description of the Related Art

In recent years, techniques for improvement in performance (e.g., reduction in power consumption or increase in definition) of a display device have been developed.

Examples of the display device include a liquid crystal display device, an electroluminescent display device (also referred to as an EL display device), and the like.

As a transistor for driving a display element (a liquid crystal element, an EL element, or the like) in the display device, a transistor in which a silicon semiconductor is used for a channel formation region, a transistor in which a metal oxide semiconductor is used for a channel formation region, or the like can be used. For example, a display device disclosed in Patent Document 1 is an example of a display device including, as a transistor for driving a display element, a transistor in which a metal oxide semiconductor is used for a channel formation region.

REFERENCE

[Patent Document 1] Japanese Published Patent Application No. 2011-44699

SUMMARY OF THE INVENTION

A conventional display device has a problem of low reliability. For example, in a conventional display device, a display element is provided between two substrates, and further, a sealant is provided between the two substrates so as to surround the display element. By attaching the two substrates to each other, the display element is sealed. However, entry of water or the like from the outside through the sealant into a sealed region degrades the characteristics of the display element or a transistor for driving the display element; thus, a malfunction is likely to occur.

In a region where the two substrates overlap with each other of the display device, a region other than a display portion (also referred to as a frame), such as a region overlapping with the sealant, is preferably small. When the frame is wide, for example, the area occupied by the display portion becomes small.

It is an object of one embodiment of the present invention to improve the reliability of a display device. It is an object of one embodiment of the present invention to suppress an increase in size of a frame of a display device. Note that in one embodiment of the present invention, it is only necessary that at least one of the above-stated objects is achieved.

In one embodiment of the present invention, entry of impurities from the outside which cause a malfunction of a display device is suppressed by closing a gap between a first substrate and a second substrate with a plurality of sealants.

In one embodiment of the present invention, a narrower frame is obtained by providing at least one of the plurality of sealants so as to extend to at least a side surface of the second substrate.

One embodiment of the present invention is a display device which includes a first substrate, a second substrate overlapping with the first substrate, a liquid crystal layer between the first substrate and the second substrate, a first sealant surrounding the liquid crystal layer between the first substrate and the second substrate, and a second sealant surrounding the first sealant, closing a gap between the first substrate and the second substrate, and extending to at least a side surface of the second substrate.

One embodiment of the present invention is an electronic device including a panel with the display device.

In accordance with one embodiment of the present invention, the reliability of a display device can be improved. An increase in size of a frame of a display device can be suppressed.

BRIEF DESCRIPTION OF THE DRAWINGS

FIGS. 6A1, 6A2, 6B1, and 6B2 illustrate an example of a method for manufacturing a display device.

FIGS. 7A1, 7A2, 7B1, and 7B2 illustrate an example of a method for manufacturing a display device.

FIGS. 8A1, 8A2, 8B1, and 8B2 illustrate an example of a method for manufacturing a display device.

FIGS. 9A1 and 9A2 illustrate an example of a method for manufacturing a display device.

FIGS. 10A1 and 10A2 illustrate an example of a method for manufacturing a display device.

DETAILED DESCRIPTION OF THE INVENTION

Embodiments of the present invention will be described below. Note that it will be readily appreciated by those skilled in the art that details of the embodiments can be modified in various ways without departing from the spirit and scope of the present invention. Thus, the present invention should not be limited to, for example, the description of the following embodiments.

Note that the contents in different embodiments can be combined with one another as appropriate. In addition, the contents of the embodiments can be replaced with each other as appropriate.

Further, the ordinal numbers such as "first" and "second" are used to avoid confusion between components and do not limit the number of each component.

In this specification, a term "parallel" indicates that the angle formed between two straight lines is greater than or equal to −10° and less than or equal to 10°, and accordingly also includes the case where the angle is greater than or equal to −5° and less than or equal to 5°. In addition, a term "perpendicular" indicates that the angle formed between two straight lines is greater than or equal to 80° and less than or equal to 100°, and accordingly includes the case where the angle is greater than or equal to 85° and less than or equal to 95°.

In this specification, trigonal and rhombohedral crystal systems are included in a hexagonal crystal system.

Embodiment 1

In this embodiment, an example of a display device which is one embodiment of the present invention will be described.

A structural example of the display device according to this embodiment will be described with reference to FIGS. 1A and 1B.

Figure 1A:
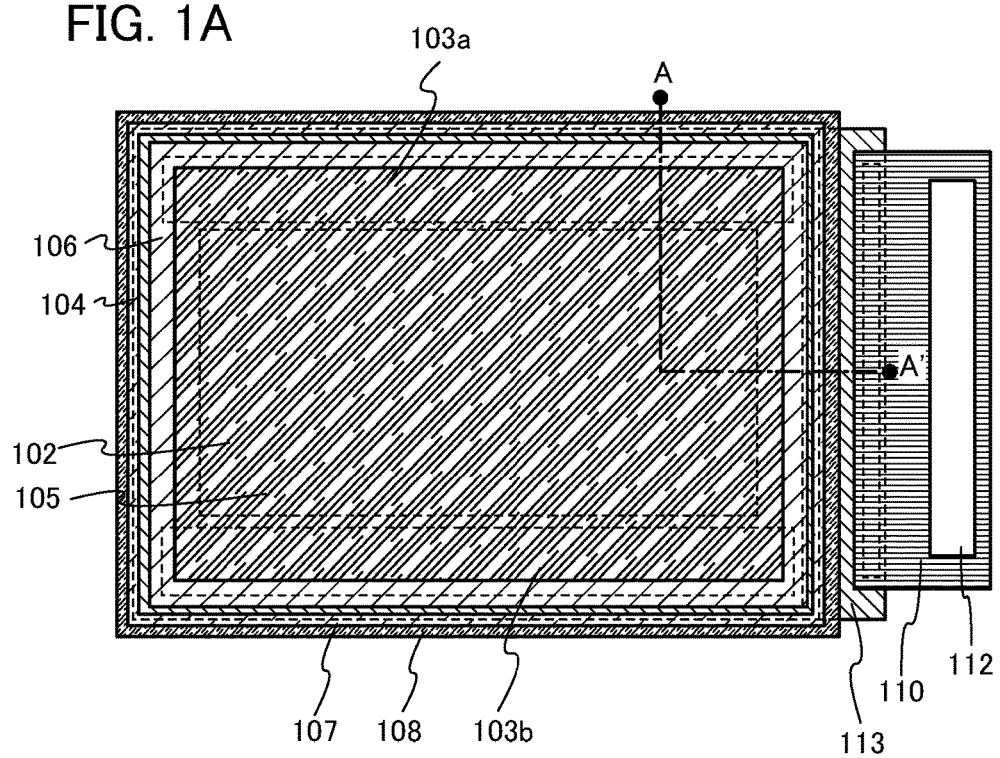
FIGS. 1A and 1B illustrate a structural example of a display device.
Figure 1B:
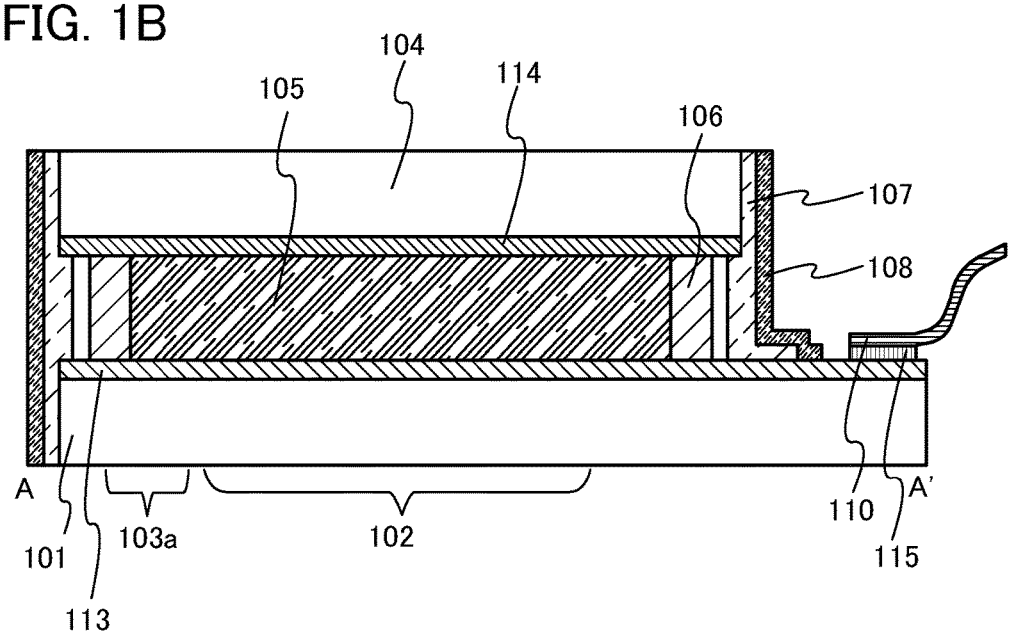

FIG. 1A is a schematic top view of the display device, and FIG. 1B is a schematic cross-sectional view along line A-A' in FIG. 1A. Note that for convenience, some of the components of the display device are not shown in FIG. 1A.

The display device illustrated in FIGS. 1A and 1B includes a substrate 101, a substrate 104, a liquid crystal layer 105 included in a display element, a sealant 106, a sealant 107, and a sealant 108.

The substrate 101 is provided with a layer 113 in which an element such as a transistor for controlling an electric field of the liquid crystal layer 105 is formed. Note that the layer 113 also includes an insulating layer having a function as a protective layer, a planarization layer, or the like over the transistor.

The substrate 104 overlaps with the substrate 101. The substrate 104 is provided with a layer 114 in which a coloring layer, a light blocking layer, an insulating layer having a function as a planarization layer, and the like is formed. Note that in FIG. 1A, the substrate 104 is indicated by a dotted line for convenience.

As the substrate 101 and the substrate 104, glass substrates can be used, for example.

The liquid crystal layer 105 is provided between the substrate 101 and the substrate 104.

The sealant 106 is provided between the substrate 101 and the substrate 104 so as to surround the liquid crystal layer 105.

The sealant 106 has at least a function of preventing or suppressing entry of substances (such as water) from the outside which are impurities for the display element or the transistor. Note that the sealant 106 may have another additional function. For example, the sealant 106 may have a structure-reinforcing function, an adhesion-enhancing function, an impact-resistance-enhancing function, or the like.

Note that as the sealant 106, it is preferable to use a material which does not dissolve in the liquid crystal layer 105 even when being in contact with the liquid crystal layer 105 before being hardened. As the sealant 106, an epoxy resin, an acrylic resin, or the like can be used, for example. Note that the above resin material may be either thermosetting or photocurable. A mixture of an acrylic-based resin and an epoxy-based resin may be used as the sealant 106. In that case, a UV initiator, a thermosetting agent, a coupling agent, or the like may be mixed. Further, a filler may be contained.

The sealant 107 is provided so as to surround the sealant 106, and is provided so as to close a gap between the substrate 101 and the substrate 104 and extend to at least a side surface of the substrate 104. Accordingly, a frame can be narrower than in the case where the sealant 107 is provided between the substrate 101 and the substrate 104. The frame can be narrower when the sealant 107 is provided in a peripheral circuit portion for a gate driver 103a, a gate driver 103b, or the like between the substrate 101 and the substrate 104. Further, the mechanical strength of the substrate 104, for example, can be increased by providing the sealant 107 so as to extend to the side surface of the substrate 104. In addition to the substrate 104, the mechanical strength of the substrate 101 can also be increased by providing the sealant 107 so as to extend to a side surface of the substrate 101. Note that in the case where the gap between the substrate 101 and the substrate 104 is closed by the sealant 106, the sealant 107 may be provided so as to be in contact with the sealant 106 and extend to at least the side surface of the substrate 104.

The sealant 107 has at least a function of preventing or suppressing entry of substances (such as water) from the outside which are impurities for the display element or the transistor. Note that the sealant 107 may have another additional function. For example, the sealant 107 may have a structure-reinforcing function, an adhesion-enhancing function, an impact-resistance-enhancing function, or the like.

It is preferable that the sealant 107 has a lower moisture permeability than the sealant 106. As the sealant 107, a resin material or a material containing frit glass or the like can be used, for example. Note that the resin material is preferably thermosetting.

Here, the "moisture permeability" refers to the mass of water permeating a material such as a film with a unit area of 1 $m^2$ per day (unit: $g/m^2 \cdot day$). By making the moisture permeability low, entry of an impurity such as water or moisture from the outside can be prevented or suppressed.

The moisture permeability can be calculated by a moisture permeability test called a MOCON method or a cup method. The MOCON method refers to a method in which water vapor permeating a target material is measured using an infrared sensor. The cup method refers to a method in which moisture permeability is measured from a change in the weight of a moisture absorbent which is placed in a cup and absorbs water vapor that has permeated a target material.

The moisture permeability of a sealant commercially available for use in a light-emitting device, for example, is 16 $g/m^2 \cdot day$ in the case where the thickness thereof is 100 μm. In the case of glass frit, the moisture permeability is 0.01 $g/m^2 \cdot day$ or less. With the use of a sealing structure according to one embodiment of the present invention, the moisture permeability of a display device can be lower than or equal to the above value.

The sealant 108 is provided so as to surround the sealant 107.

For the sealant 108, a material containing a metal material, a thermoplastic resin (such as plastic), or the like can be used, for example, and as the metal material, a material containing aluminum, copper, lead, nickel, or the like can be used, for example. For the sealant 108, solder may be used. In that case, it is preferable that the melting point of solder be lower than the melting point of the sealant 107. As solder, a Sn—Pb-based, Pb—Sn—Sb-based, Sn—Sb-based, Sn—Pb—Bi-based, Sn—Cu-based, Sn—Pb—Cu-based, Sn—In-based, Sn—Ag-based, Sn—Pb—Ag-based, or Pb—Ag-based material or the like can be used. Note that Pb is harmful to human bodies or environment, so lead-free solder is preferably used. It is preferable that the sealant 108 have a lower moisture permeability than the sealant 106. It is also preferable that the sealant 108 have a lower moisture permeability than the sealant 107. As the sealant 108, a stainless steel plate (such as a SUS plate) may be provided.

Note that a material which can be used for the sealant 108 may be used for the sealant 107. In that case, the sealant 108 is not necessarily provided.

Note that the width of the sealant 107 and the sealant 108 is preferably 1 mm or less, more preferably 0.5 mm or less.

As the transistor included in the layer 113, a transistor in which an oxide semiconductor is used for a channel formation region can be used, for example.

For example, an In-based metal oxide, a Zn-based metal oxide, an In—Zn-based metal oxide, or an In—Ga—Zn-based metal oxide can be used as the oxide semiconductor. Alternatively, a metal oxide including another metal element instead of part or all of Ga in the In—Ga—Zn-based metal oxide may be used. The oxide semiconductor may include a crystal.

A structure of an oxide semiconductor film which can be used for the channel formation region of the transistor will be described below.

An oxide semiconductor film is classified roughly into a single-crystal oxide semiconductor film and a non-single-crystal oxide semiconductor film. The non-single-crystal oxide semiconductor film includes any of an amorphous oxide semiconductor film, a microcrystalline oxide semiconductor film, a polycrystalline oxide semiconductor film, a c-axis aligned crystalline oxide semiconductor (CAAC-OS) film, and the like.

The amorphous oxide semiconductor film has disordered atomic arrangement and no crystalline component. A typical example thereof is an oxide semiconductor film in which no crystal part exists even in a microscopic region, and the whole of the film is amorphous.

The microcrystalline oxide semiconductor film includes a microcrystal (also referred to as nanocrystal) with a size greater than or equal to 1 nm and less than 10 nm, for example. Thus, the microcrystalline oxide semiconductor film has a higher degree of atomic order than the amorphous oxide semiconductor film. Hence, the density of defect states of the microcrystalline oxide semiconductor film is lower than that of the amorphous oxide semiconductor film.

The CAAC-OS film is one of oxide semiconductor films including a plurality of crystal parts, and most of the crystal parts each fit inside a cube whose one side is less than 100 nm. Thus, there is a case where a crystal part included in the CAAC-OS film fits inside a cube whose one side is less than 10 nm, less than 5 nm, or less than 3 nm. The density of defect states of the CAAC-OS film is lower than that of the microcrystalline oxide semiconductor film. The CAAC-OS film is described in detail below.

In a transmission electron microscope (TEM) image of the CAAC-OS film, a boundary between crystal parts, that is, a grain boundary is not clearly observed. Thus, in the CAAC-OS film, a reduction in electron mobility due to the grain boundary is less likely to occur.

According to the TEM image of the CAAC-OS film observed in a direction substantially parallel to a sample surface (cross-sectional TEM image), metal atoms are arranged in a layered manner in the crystal parts. Each metal atom layer has a morphology reflected by a surface where the CAAC-OS film is formed (hereinafter, a surface where the CAAC-OS film is formed is referred to as a formation surface) or a top surface of the CAAC-OS film, and is arranged in parallel to the formation surface or the top surface of the CAAC-OS film.

On the other hand, according to the TEM image of the CAAC-OS film observed in a direction substantially perpendicular to the sample surface (planar TEM image), metal atoms are arranged in a triangular or hexagonal configuration in the crystal parts. However, there is no regularity of arrangement of metal atoms between different crystal parts.

From the results of the cross-sectional TEM image and the planar TEM image, alignment is found in the crystal parts in the CAAC-OS film.

A CAAC-OS film is subjected to structural analysis with an X-ray diffraction (XRD) apparatus. For example, when the CAAC-OS film including an $InGaZnO_4$ crystal is analyzed by an out-of-plane method, a peak appears frequently when the diffraction angle ($2\theta$) is around 31°. This peak is derived from the (009) plane of the $InGaZnO_4$ crystal, which indicates that crystals in the CAAC-OS film have c-axis alignment, and that the c-axes are aligned in a direction substantially perpendicular to the formation surface or the top surface of the CAAC-OS film.

On the other hand, when the CAAC-OS film is analyzed by an in-plane method in which an X-ray enters a sample in a direction perpendicular to the c-axis, a peak appears frequently when $2\theta$ is around 56°. This peak is derived from the (110) plane of the $InGaZnO_4$ crystal. Here, analysis ($\phi$ scan) is performed under conditions where the sample is rotated around a normal vector of a sample surface as an axis ($\phi$ axis) with $2\theta$ fixed at around 56°. In the case where the sample is a single-crystal oxide semiconductor film of $InGaZnO_4$, six peaks appear. The six peaks are derived from crystal planes equivalent to the (110) plane. On the other hand, in the case of a CAAC-OS film, a peak is not clearly observed even when $\phi$ scan is performed with $2\theta$ fixed at around 56°.

According to the above results, in the CAAC-OS film having c-axis alignment, while the directions of a-axes and b-axes are different between crystal parts, the c-axes are aligned in a direction parallel to a normal vector of a formation surface or a normal vector of a top surface. Thus, each metal atom layer arranged in a layered manner observed in the cross-sectional TEM image corresponds to a plane parallel to the a-b plane of the crystal.

Note that the crystal part is formed concurrently with deposition of the CAAC-OS film or is formed through crystallization treatment such as heat treatment. As described above, the c-axis of the crystal is aligned in a direction parallel to a normal vector of a formation surface or a normal vector of a top surface of the CAAC-OS film. Thus, for example, in the case where a shape of the CAAC-OS film is changed by etching or the like, the c-axis might not be necessarily parallel to a normal vector of a formation surface or a normal vector of a top surface of the CAAC-OS film.

Further, the degree of crystallinity in the CAAC-OS film is not necessarily uniform. For example, in the case where crystal growth leading to the CAAC-OS film occurs from the vicinity of the top surface of the film, the degree of the crystallinity in the vicinity of the top surface is higher than that in the vicinity of the formation surface in some cases. Further, when an impurity is added to the CAAC-OS film, the crystallinity in a region to which the impurity is added is changed, and the degree of crystallinity in the CAAC-OS film varies depending on regions.

Note that when the CAAC-OS film with an $InGaZnO_4$ crystal is analyzed by an out-of-plane method, a peak of $2\theta$ may also be observed at around 36°, in addition to the peak of $2\theta$ at around 31°. The peak of $2\theta$ at around 36° indicates that a crystal having no c-axis alignment is included in part of the CAAC-OS film. It is preferable that in the CAAC-OS film, a peak of $2\theta$ appear at around 31° and a peak of $2\theta$ do not appear at around 36°.

In a transistor using the CAAC-OS film, change in electrical characteristics due to irradiation with visible light or ultraviolet light is small. Thus, the transistor has high reliability.

Note that an oxide semiconductor film may be a stacked film including two or more films of an amorphous oxide semiconductor film, a microcrystalline oxide semiconductor film, and a CAAC-OS film, for example.

When the oxide semiconductor film contains a compound including hydrogen such as water, the compound may partly serve as an impurity which imparts n-type conductivity and may cause a defect in electrical characteristics such as an increase in off-state current of a transistor or a shift of the threshold voltage in the negative direction. However, entry of water into the display device of this embodiment can be suppressed or prevented because the display device includes the sealant 106 having a function of suppressing or preventing the entry of substances (such as water) from the outside which are impurities for the display element or the transistor and the sealant 107 provided outside so as to surround the sealant 106 and having a lower moisture permeability than the sealant 106. Thus, degradation and changes of electrical characteristics of the transistor included in the display device can be suppressed, and the reliability of the display device can be improved.

Note that the transistor included in the layer 113 is not limited to a transistor including an oxide semiconductor, and for example, a transistor including a semiconductor including a Group 14 element (such as silicon) may be used. In this case, the semiconductor including a Group 14 element may be single-crystal, polycrystalline, or amorphous.

The display device illustrated in FIGS. 1A and 1B further includes a display portion 102 where a plurality of pixel circuits is provided, a gate driver 103a, and a gate driver 103b. For example, the gate driver 103a and the gate driver 103b are provided in a portion of the layer 113 over the substrate 101. Note that the display device may include either the gate driver 103a or the gate driver 103b. In that case, the frame is preferably 1 mm or less, more preferably 0.5 mm or less.

The plurality of pixel circuits is arranged in a matrix in the display portion 102. The pixel circuits each include a liquid crystal element, a transistor, and a capacitor. The liquid crystal element includes a pair of electrodes and the liquid crystal layer 105 in which the orientation of a liquid crystal is controlled by a voltage applied between the pair of electrodes. The transistor controls the electric field of the liquid crystal layer 105 and is electrically connected to one of the pair of electrodes of the liquid crystal element. The capacitor has a function of maintaining a voltage applied to the liquid crystal element.

Furthermore, a source driver 112 is electrically connected to the display device illustrated in FIGS. 1A and 1B through a flexible printed board (also referred to as FPC) 110. The flexible printed board 110 is electrically connected to a terminal electrode provided in the layer 113 through an anisotropic conductive layer 115. Note that the source driver 112 may be provided in the layer 113.

Note that the structure of the display device in this embodiment is not limited to that illustrated in FIGS. 1A and 1B.

Figure 2A:
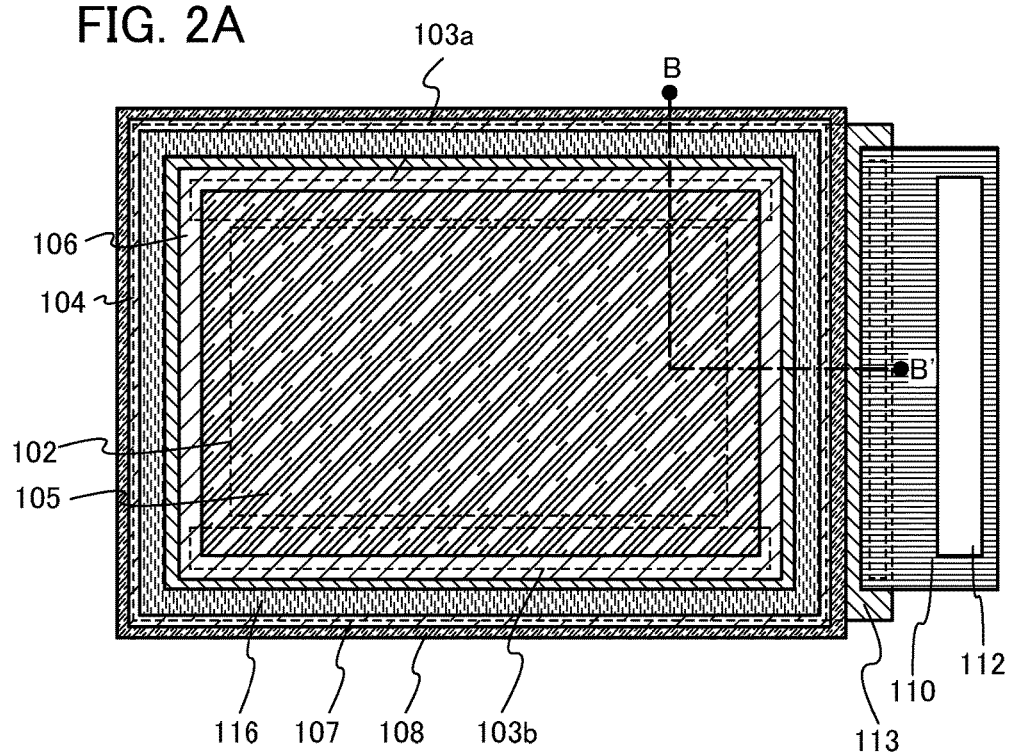
FIGS. 2A and 2B illustrate a structural example of a display device.
Figure 2B:
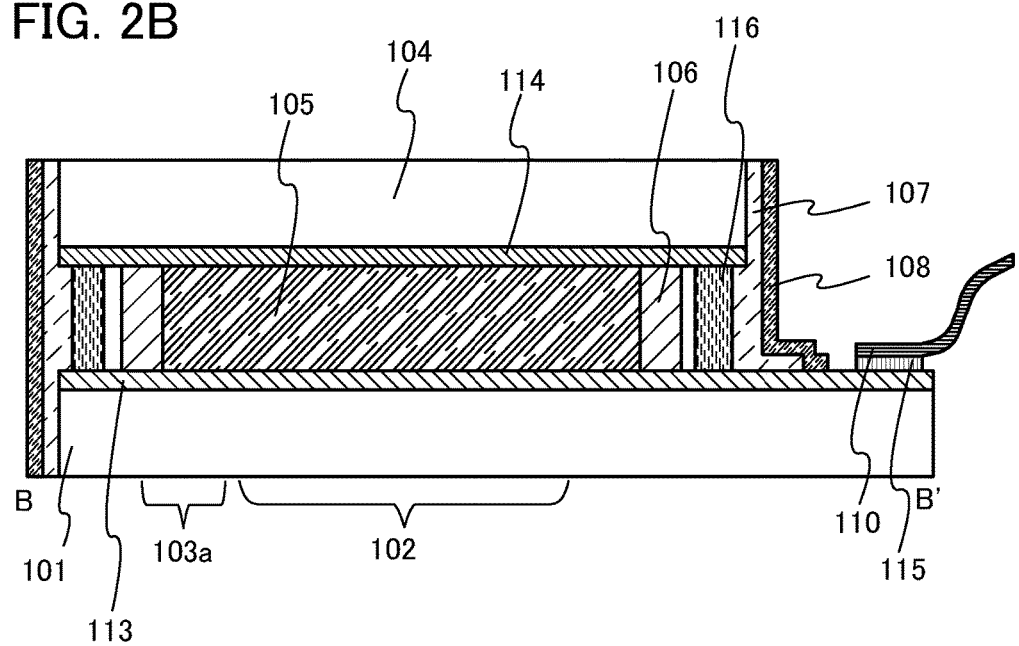

For example, a display device illustrated in FIGS. 2A and 2B includes a sealant 116 in addition to the components of the display device illustrated in FIGS. 1A and 1B. FIG. 2A is a schematic top view of the display device, and FIG. 2B is a schematic cross-sectional view along line B-B' in FIG. 2A. Note that for the same portions as those of the display device in FIGS. 1A and 1B, the description of the display device illustrated in FIGS. 1A and 1B can be referred to as appropriate.

The sealant 116 is provided so as to surround the sealant 106 and close the gap between the substrate 101 and the substrate 104. The sealant 107 is provided so as to surround the sealant 116.

As the sealant 116, a material containing frit glass can be used, for example.

The sealant 116 can enhance the effect of suppressing entry of impurities (such as water) from the outside which cause a malfunction of the display device.

Figure 3A:
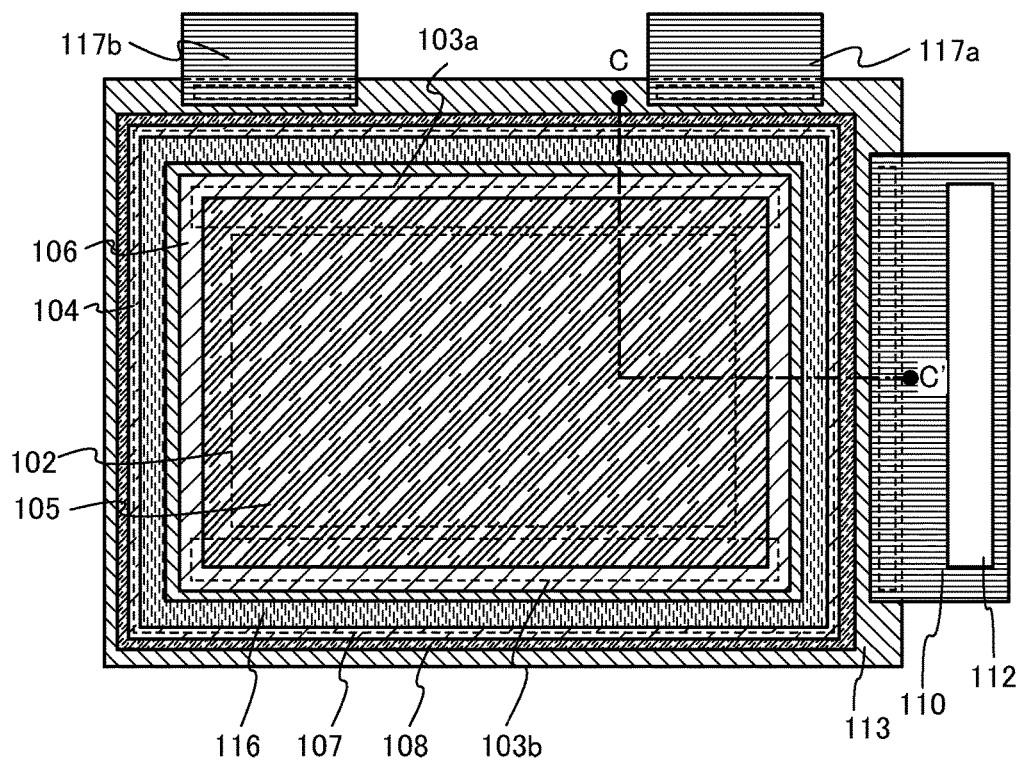
FIGS. 3A and 3B illustrate a structural example of a display device.
Figure 3B:
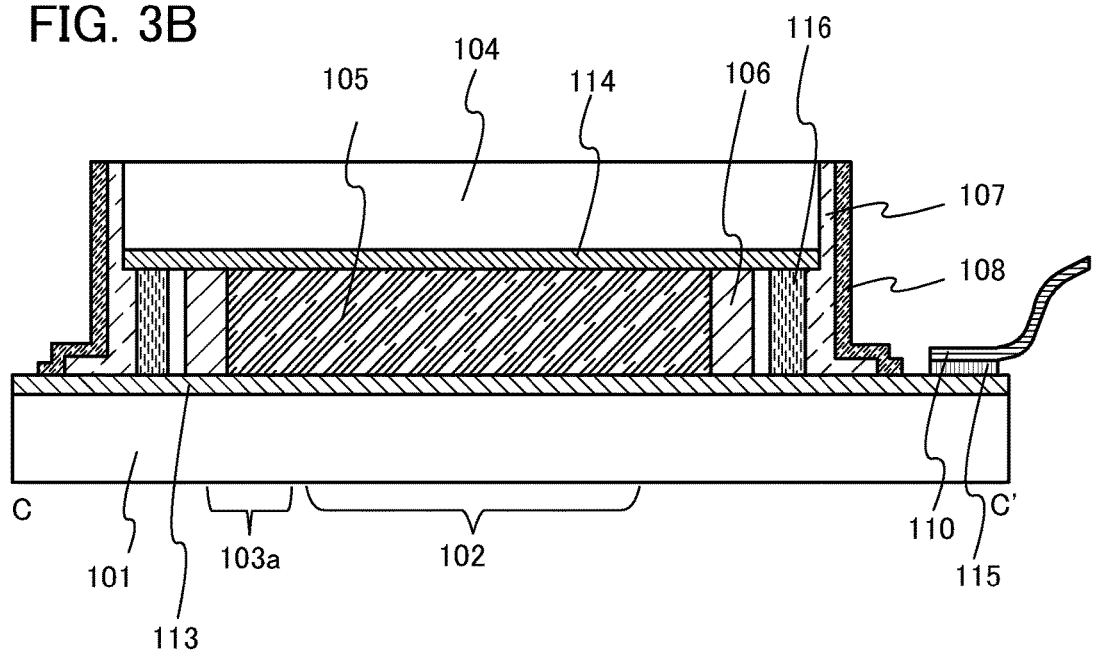

A display device illustrated in FIGS. 3A and 3B differs from the display device illustrated in FIGS. 2A and 2B in that the substrate 101 extends beyond the edge of the substrate 104. FIG. 3A is a schematic top view of the display device, and FIG. 3B is a schematic cross-sectional view along line C-C' in FIG. 3A. Note that for the same portions as those of the display device in FIGS. 1A and 1B, the description of the display device illustrated in FIGS. 1A and 1B can be referred to as appropriate.

The sealant 107 is provided so as to surround the sealant 116, close the gap between the substrate 101 and the substrate 104, and extend to an upper surface of the substrate 101 and the side surface of the substrate 104. The sealant 108 is provided so as to surround the sealant 107. The above structure is employed in the case where flexible printed boards 117a and 117b are provided so that a plurality of flexible printed boards is provided as illustrated in FIGS. 3A and 3B, for example.

Figure 4A:
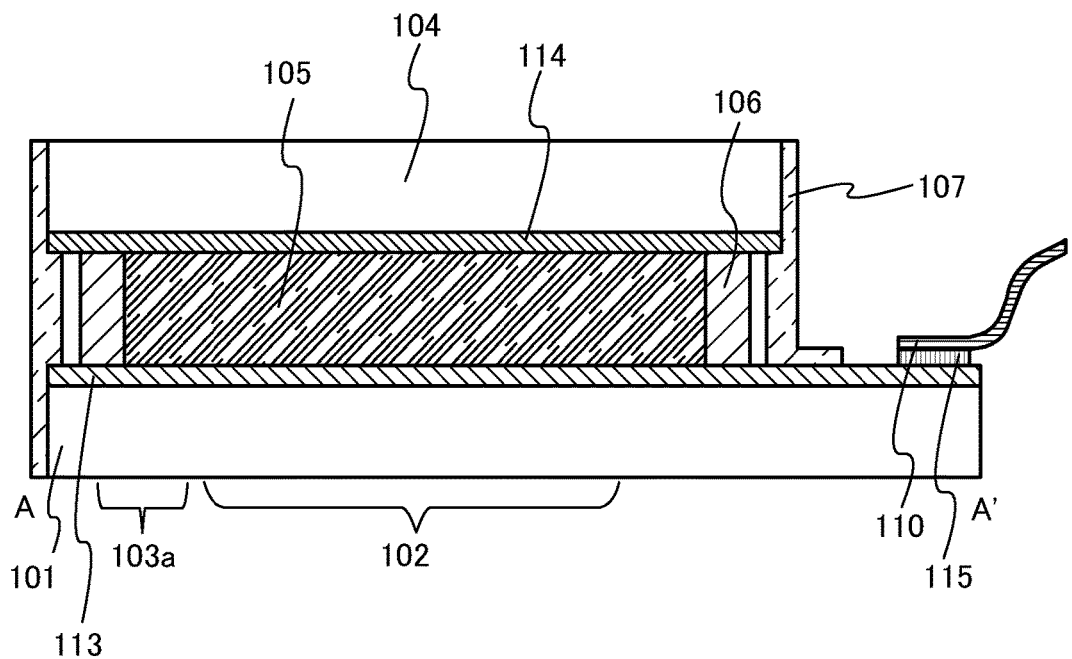
FIGS. 4A and 4B each illustrate a structural example of a display device.

Furthermore, as illustrated in FIG. 4A, a structure may be employed in which the sealant 108 in the display device illustrated in FIGS. 1A and 1B is not provided.

Figure 4B:
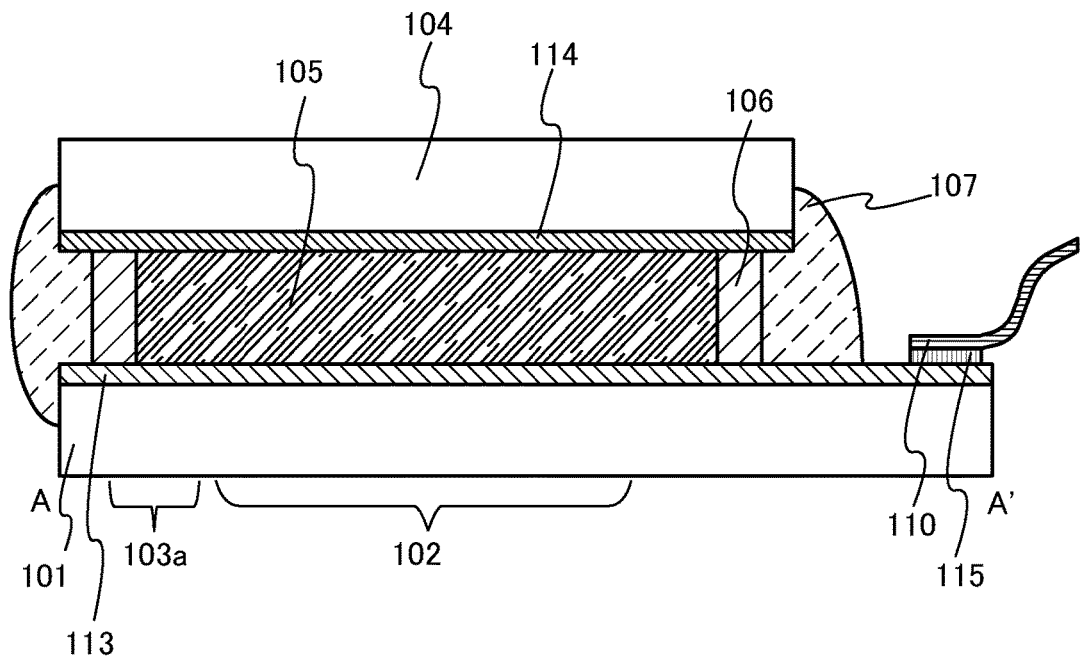

Moreover, as illustrated in FIG. 4B, a structure may be employed in which the sealant 108 in the display device illustrated in FIGS. 1A and 1B is not provided and the sealant 107 extends to part of the upper surface, to the side surface (excluding the side surface overlapping with the flexible printed board 110) of the substrate 101, and to the side surface of the substrate 104. As illustrated in FIG. 4B, the sealant 107 may be in contact with a side surface of the sealant 106.

Figure 5A:
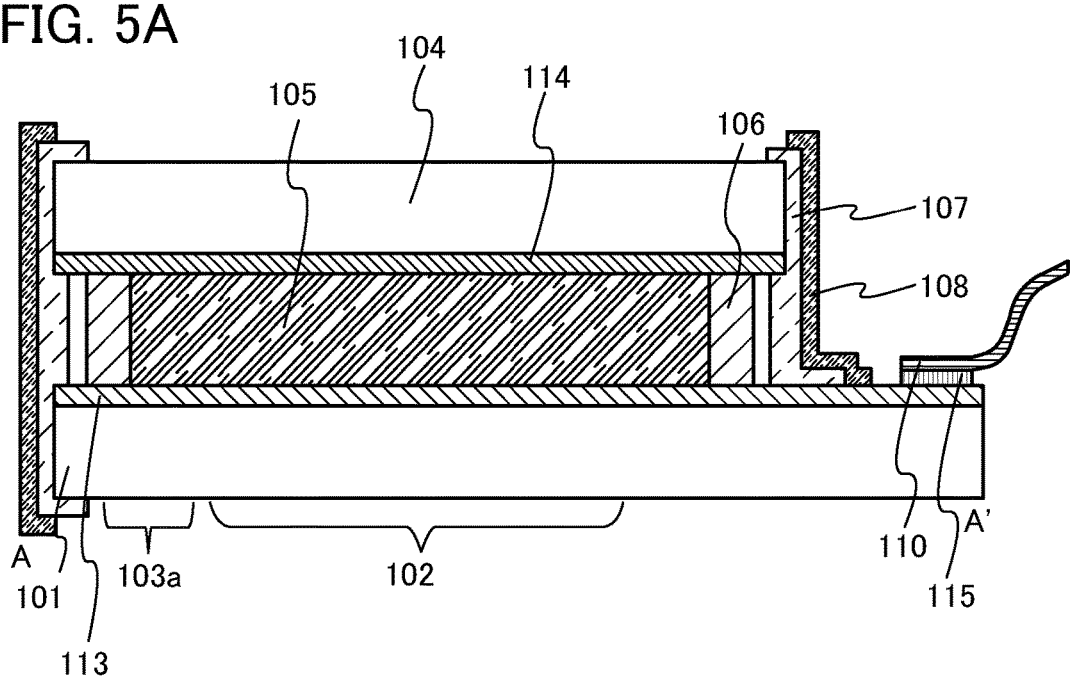
FIGS. 5A and 5B each illustrate a structural example of a display device.

FIGS. 1A and 1B illustrate the example of the display device in which the upper surfaces of the substrates 101 and 104 and end portions of the sealants 107 and 108 are roughly aligned with each other, but the present invention is not limited to this example. For example, as illustrated in FIG. 5A, a structure may be employed in which a region of an end portion of the sealant 107 is in contact with part of a surface of the substrate 101 or 104, or both, opposite the liquid crystal layer 105 side. In that case, an end portion of the sealant 108 may be provided so as to overlap with that region. Accordingly, the mechanical strengths of the substrate 101 and the substrate 104 can be increased.

Figure 5B:
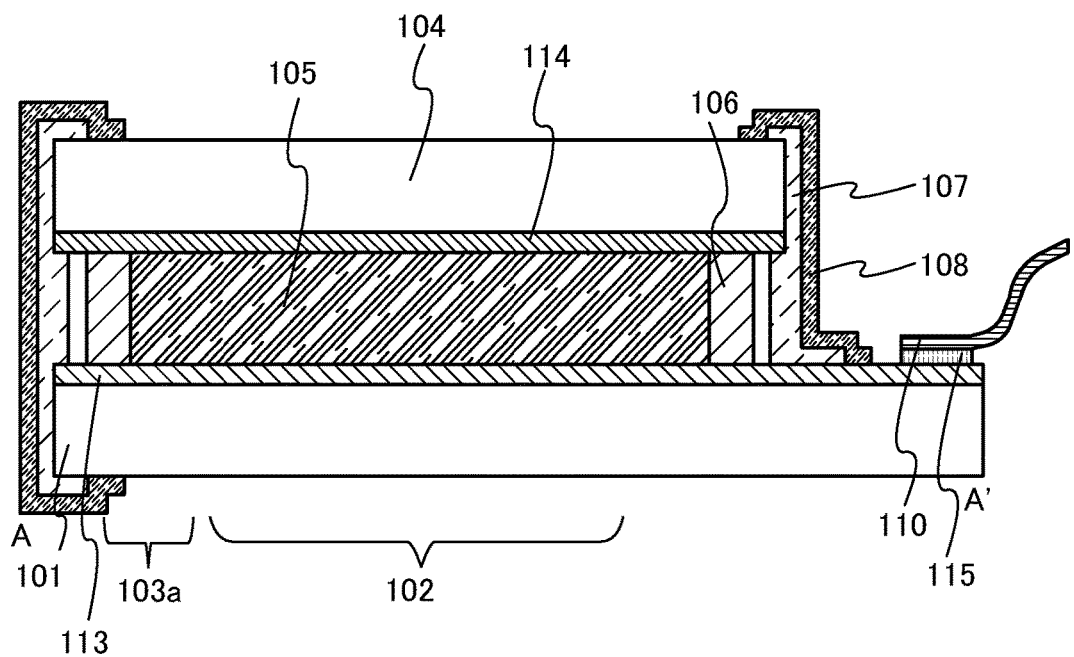

Furthermore, as illustrated in FIG. 5B, a structure may be employed in which a region of an end portion of the sealant 107 is in contact with part of a surface of the substrate 101 or 104, or both, opposite the liquid crystal layer 105 side, and in which a region of an end portion of the sealant 108 overlaps with that region and is in contact with part of a surface of the substrate 101 or 104, or both, opposite the liquid crystal layer 105 side. Accordingly, the mechanical strengths of the substrate 101 and the substrate 104 can be increased, and in addition, the effect of suppressing the entry of impurities which cause a malfunction of the display device can be enhanced.

Note that the structure of the display device illustrated in FIGS. 2A and 2B may be combined as appropriate with any of the structures of the display devices illustrated in FIGS. 3A and 3B, FIGS. 4A and 4B, and FIGS. 5A and 5B.

Next, as an example of a method for manufacturing the display device according to this embodiment, an example of a method for manufacturing the display device illustrated in FIGS. 1A and 1B will be described with reference to FIGS. 6A1, 6A2, 6B1, and 6B2, FIGS. 7A1, 7A2, 7B1, and 7B2, FIGS. 8A1, 8A2, 8B1, and 8B2, and FIGS. 9A1 and 9A2. Here, as one example, an example of a method for manufacturing the display device by using a one drop filling (also referred to as ODF) method will be described. Note that the present invention is not limited to this example, and a liquid crystal injection method may be used instead of the ODF method.

First, the substrate 101 is prepared, the layer 113 is formed by forming elements such as transistors over the substrate 101, and the sealant 106 is formed over the layer 113 (see FIGS. 6A1 and 6A2).

In the formation of the layer 113, transistors which are arranged in the display portion 102 and included in the pixel circuits and transistors which are included in the gate driver 103a and the gate driver 103b are formed. Furthermore, at this time, an insulating layer may be formed over the transistors and electrodes included in the liquid crystal elements may be formed over the insulating layer. In the case where an alignment film or the like is necessary, the alignment film may be formed and rubbing treatment may be performed.

In the formation of the sealant 106, a seal pattern is formed in a closed loop shape over the layer 113 by using a screen printing method, an inkjet apparatus, a dispenser apparatus, or the like, for example. Note that the seal pattern may be formed in a rectangular, circular, elliptical, or polygonal shape. The seal pattern is not necessarily formed over the substrate 101. For example, the substrate 104 provided with the layer 114 in advance may be prepared, and the seal pattern may be formed over the layer 114 as the sealant 106.

Next, a liquid crystal 120 is dripped into a region surrounded by the sealant 106 in a plan view (see FIGS. 6B1 and 6B2).

For example, the liquid crystal 120 is dripped using a dispenser apparatus, an inkjet apparatus, or the like. Note that a plurality of drops of the liquid crystal 120 may be dripped.

Next, the substrate 104 provided with the layer 114 including the coloring layer and the light blocking layer in advance and the substrate 101 are attached to each other so that the layer 113 and the layer 114 face each other. In addition, heat treatment is performed to harden the sealant 106, and then the substrate 101 and the substrate 104 are divided (see FIGS. 7A1 and 7A2). The liquid crystal 120 in the region surrounded by the sealant 106 corresponds to the liquid crystal layer 105. Note that in the case where the layer 114 should be provided with an alignment film or the like, the alignment film may be formed and rubbing treatment may be performed in advance.

In the case where the substrate 101 and the substrate 104 are attached to each other under a reduced pressure atmosphere, for example, the region surrounded by the sealant 106 can be easily filled with the liquid crystal 120. In addition, after the substrate 101 and the substrate 104 are attached to each other, heat treatment for controlling the orientation of the liquid crystal may be performed.

Note that in the case where a liquid crystal exhibiting a blue phase is used as the liquid crystal layer 105, treatment for phase transition from an isotropic phase to a blue phase and polymer stabilization treatment are preferably performed on the liquid crystal layer 105 before the sealant 106 is hardened. For example, the phase transition treatment can be performed as follows: heat treatment is performed on the liquid crystal layer 105 at a temperature within +10° C., preferably +5° C. from the phase transition temperature between the blue phase and the isotropic phase, and then the temperature is gradually decreased. Note that the phase transition temperature between the blue phase and the isotropic phase is a temperature at which the phase changes from the blue phase to the isotropic phase when the temperature rises, or a temperature at which the phase changes from the isotropic phase to the blue phase when the temperature decreases. For example, the polymer stabilization treatment can be performed in such a manner that a liquid crystal material including a liquid crystal, a chiral material, an ultraviolet curable resin, and a photopolymerization initiator is irradiated with light having a wavelength with which the ultraviolet curable resin and the photopolymerization initiator are reacted, in a state in which the blue phase is exhibited.

The substrate 101 and the substrate 104 are each divided using a cutting apparatus such as a scriber apparatus or a roll cutter, for example.

Next, the sealant 107 is formed so as to close the gap between the substrate 101 and the substrate 104 (see FIGS. 7B1 and 7B2).

In the case where the sealant 107 is formed after the substrate 101 and the substrate 104 are attached to each other as illustrated in FIGS. 7B1 and 7B2, a narrower frame can be obtained than in the case where the substrate 101 and the substrate 104 are attached to each other after the sealant 107 is formed over the substrate 101 or the substrate 104.

In the formation of the sealant 107, a paste including a material which can be used for the sealant 107 is dripped along a side surface of the substrate 104 by using a dispenser apparatus or the like, for example. Here, the case of forming the sealant 107 using frit glass is described as an example.

In the case where the sealant 107 is formed using frit glass, the gap between the substrate 101 and the substrate 104 is closed first by dripping a frit paste obtained by mixing glass powder and an adhesive organic resin, along the side surface of the substrate 104 by using a dispenser apparatus or the like. Then, heat treatment is performed to remove an organic material from the frit paste and melt and solidify the frit paste, whereby the sealant 107 is formed. Without limitation to this example, the sealant 107 may be formed by attaching a glass ribbon or the like to the side surface of the substrate 104 and then performing heat treatment to close the gap between the substrate 101 and the substrate 104, for example.

Note that laser light irradiation may be performed as the heat treatment. In that case, the output is preferably adjusted so as to prevent laser light from deteriorating the liquid crystal layer 105. In the case of laser light irradiation, laser light may be output from a laser through an optical fiber or the like, for example. Note that it is preferable that the sealant 106 and the sealant 107 be apart from each other, but without limitation thereto, the sealant 106 and the sealant 107 may be in contact with each other.

For the laser light, a gas laser typified by an excimer laser or a solid-state laser typified by a YAG laser can be used as a light source. The wavelength of the laser light is preferably within an infrared light region, and a wavelength of from 780 nm to 2000 nm is employed. For example, laser light having a wavelength of 810 nm to 940 nm is preferably used. The beam shape is not particularly limited and can be a rectangular, linear, or circular shape or the like, for example.

As the glass powder used for the frit glass, it is possible to use a material containing one or more of the following: magnesium oxide, calcium oxide, barium oxide, lithium oxide, sodium oxide, potassium oxide, boron oxide, vanadium oxide, zinc oxide, tellurium oxide, aluminum oxide, silicon dioxide, lead oxide, tin oxide, phosphorus oxide, ruthenium oxide, rhodium oxide, iron oxide, copper oxide, titanium oxide, tungsten oxide, bismuth oxide, antimony oxide, lead borate glass, tin phosphate glass, vanadate glass, and borosilicate glass, for example. In the case where a pigment or the like is added to the frit paste, the laser light absorptance can be increased and the laser light output can be decreased. In addition, damage to another layer by laser light can be reduced.

Note that in the case where the sealant 116 illustrated in FIGS. 2A and 2B is formed using frit glass, a material and a method similar to those described above can be used. In that case, the sealant 116 can be formed by laser light irradiation from above the substrate 104 to melt the frit paste and bind the glass powder and then by solidification.

In the case where the sealant 116 illustrated in FIGS. 2A and 2B is formed using frit glass, the adhesion between the substrate 101 and the substrate 104 can be increased by forming the sealant 107 under reduced pressure.

Next, the sealant 108 is formed so as to surround the sealant 107 (see FIGS. 8A1 and 8A2).

In the case of using a metal material for the sealant 108, the sealant 108 can be formed by forming a film of a metal material which can be used for the sealant 108, on the side surface of the sealant 107 by using a sputtering method or the like, for example.

In the case of using solder for the sealant 108, the sealant 108 may be formed by melting solder onto the sealant 107 using a heated soldering iron while ultrasonic waves are being emitted from the tip of the soldering iron, for example. In such a method, ultrasonic cavitation occurs and the sealant 108 can be formed while a coating on the sealant 107 is being removed, for example; thus, the adhesion between the sealant 107 and the sealant 108 can be increased.

Note that the present invention is not limited to this example, and the sealant 108 may be formed as illustrated in FIGS. 10A1 and 10A2 by placing a frame-like object 130, which has a hollow structure and is formed in advance using a material that can be used for the sealant 108, from above onto a structure body including the substrate 101 and the substrate 104, for example. Note that the present invention is not limited to this example, and the sealant 107 and the sealant 108 may be formed by forming the sealant 107 on the inner side of the frame-like object 130 and then placing the frame-like object 130 provided with the sealant 107 onto the structure body, for example.

Next, the side surface of the sealant 108 is irradiated with laser light 121 (see FIGS. 8B1 and 8B2). As the laser light 121, the same laser light as that used in the heat treatment for forming the sealant 107 may be used, for example.

For example, irradiation with the laser light 121 is performed in a direction parallel to the substrate 101 is performed while the substrate 101 is being rotated in the parallel direction. In that case, the output of the laser light 121 is preferably at a level sufficient to melt part of the sealant 107 through the sealant 108, for example. By irradiation with the laser light 121, the adhesion between the sealant 107 and the sealant 108 can be increased. Note that the irradiation with the laser light 121 is not necessarily performed on the side surface of the sealant 108, and for example, irradiation with laser light may be performed at an angle of 10° to 45° with respect to the surface of the substrate 101.

In the case of using frit glass for the sealant 107, the sealant 107 may be irradiated with laser light for pre-baking before the sealant 108 is formed. After that, the sealant 108 may be formed, the side surface of the sealant 108 may be irradiated with the laser light 121 to melt the sealant 107 and bind glass powder, and then the sealant may be solidified.

Next, the flexible printed board 110 connected to the source driver 112 is attached to a terminal portion by using the anisotropic conductive layer 115 (see FIGS. 9A1 and 9A2).

The above is the descriptions of the example of the method for manufacturing the display device illustrated in FIGS. 1A and 1B.

As described with reference to FIGS. 1A to 10A2, in one example of the display device according to this embodiment, a first sealant which has a function of sealing a liquid crystal layer between two substrates is provided, and a second sealant which closes a gap between the first substrate and the second substrate and extends to at least a side surface of the second substrate is provided. The second sealant can suppress entry of impurities (such as water) which cause a malfunction of the display device. Accordingly, the reliability can be improved. In addition, in the case where a third sealant is further provided so as to surround the second sealant, the effect of suppressing entry of the impurities can be enhanced.

In one example of the display device according to this embodiment, the second sealant is provided so as to close the gap between the first substrate and the second substrate and extend to at least the side surface of the second substrate, after the first substrate and the second substrate are attached to each other. Accordingly, a narrower frame can be obtained than in the case where the first substrate and the second substrate are attached to each other after the second sealant is formed over the first substrate.

The method and the structure described above in this embodiment can be combined as appropriate with any of the methods and structures described in the other embodiments.

Embodiment 2

In this embodiment, an example of a liquid crystal display device including a transistor in which a metal oxide semiconductor is used for a channel formation region will be described as an example of the display device.

Examples of display methods of the liquid crystal display device according to this embodiment include a TN (twisted nematic) mode, an IPS (in-plane switching) mode, a STN (super twisted nematic) mode, a VA (vertical alignment) mode, an ASM (axially symmetric aligned micro-cell) mode, an OCB (optically compensated birefringence) mode, an FLC (ferroelectric liquid crystal) mode, an AFLC (anti-ferroelectric liquid crystal) mode, an MVA (multi-domain vertical alignment) mode, a PVA (patterned vertical alignment) mode, an FFS (fringe field switching) mode, a TBA (transverse bend alignment) mode, and the like.

A liquid crystal element may be formed using a liquid crystal composition including a liquid crystal exhibiting a blue phase and a chiral material. The liquid crystal exhibiting a blue phase has a short response time of 1 msec or less and is optically isotropic; therefore, alignment treatment is not necessary and the viewing angle dependence is small.

The liquid crystal exhibiting a blue phase has a short response time and is optically isotropic; therefore, alignment treatment is not necessary and the viewing angle dependence is small. Therefore, with the liquid crystal exhibiting a blue phase, the operation speed of the liquid crystal display device can be increased.

A structural example of the liquid crystal display device in this embodiment will be described with reference to FIGS. 11A and 11B.

Figure 11A:
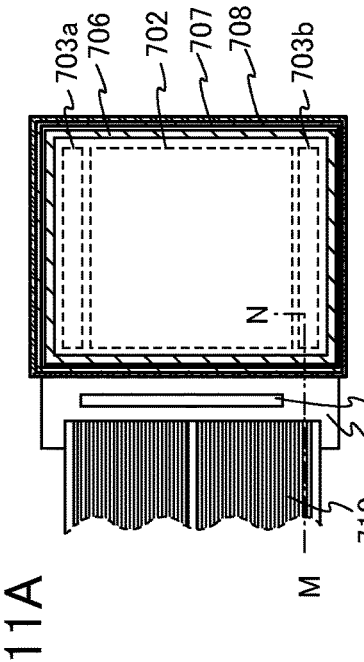
FIGS. 11A and 11B illustrate a structural example of a liquid crystal display device.
Figure 11B:
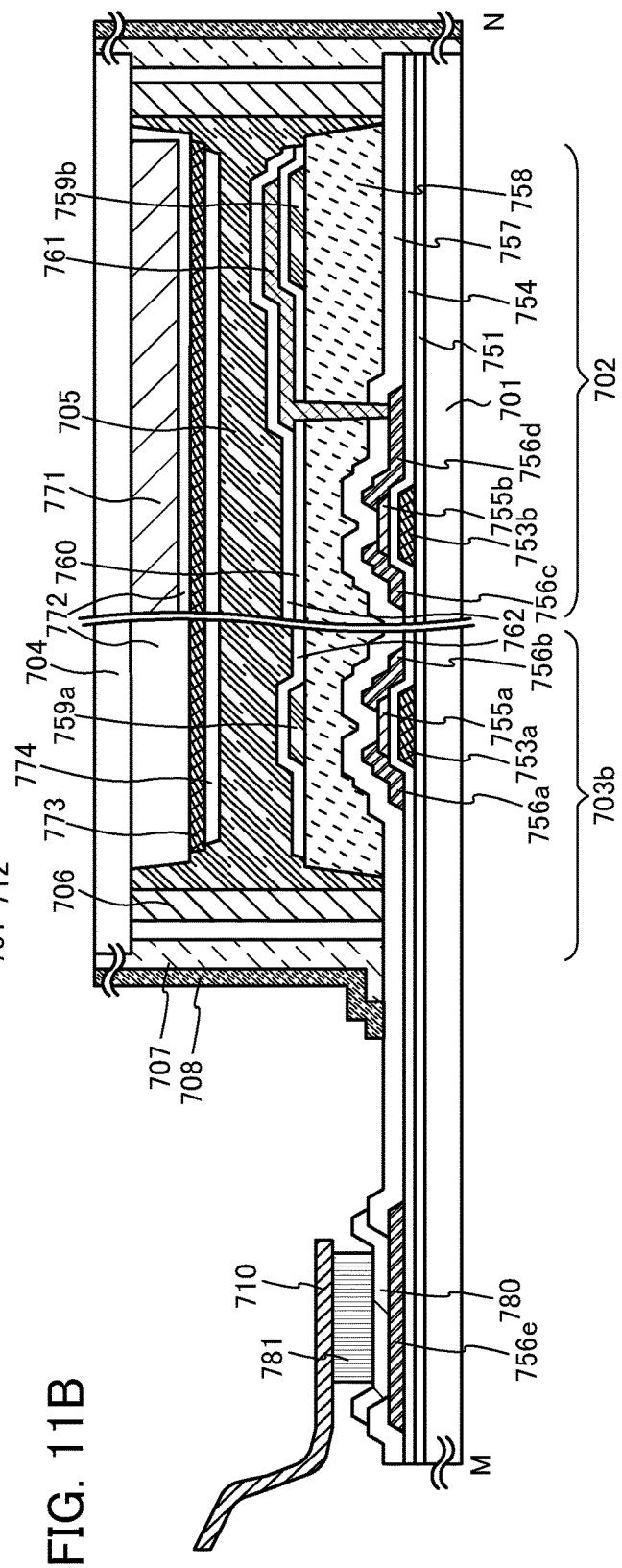

FIG. 11A is a schematic top view of the liquid crystal display device, and FIG. 11B is a schematic cross-sectional view along line M-N in FIG. 11A. Note that for convenience, some of the components of the liquid crystal display device are not shown in FIG. 11A.

The liquid crystal display device illustrated in FIGS. 11A and 11B includes a display portion 702 where a pixel circuit is provided, a gate driver 703a, a gate driver 703b, and a source driver 712.

Conductive layers 753a and 753b are provided over the same plane of a substrate 701 with an insulating layer 751 provided therebetween.

The conductive layer 753a is provided in the gate driver 703b. The conductive layer 753a serves as a gate of a transistor in the gate driver 703b.

The conductive layer 753b is provided in the display portion 702. The conductive layer 753b serves as a gate of a transistor in the pixel circuit. The transistor in the pixel circuit has a function of controlling an electric field applied to a liquid crystal layer 705.

An insulating layer 754 is provided over the conductive layers 753a and 753b. The insulating layer 754 serves as a gate insulating layer of the transistor in the gate driver 703b and a gate insulating layer of the transistor in the pixel circuit.

A semiconductor layer 755a overlaps with the conductive layer 753a with the insulating layer 754 provided therebetween. The semiconductor layer 755a serves as a layer where a channel is formed (also referred to as a channel formation layer) of the transistor in the gate driver 703b.

A semiconductor layer 755b overlaps with the conductive layer 753b with the insulating layer 754 provided therebetween. The semiconductor layer 755b serves as a channel formation layer of the transistor in the pixel circuit. Note that the semiconductor layers 755a and 755b are formed using the same semiconductor layer.

A conductive layer 756a is electrically connected to the semiconductor layer 755a. The conductive layer 756a serves as one of a source and a drain of the transistor in the gate driver 703b.

A conductive layer 756b is electrically connected to the semiconductor layer 755a. The conductive layer 756b serves as the other of the source and the drain of the transistor in the gate driver 703b.

A conductive layer 756c is electrically connected to the semiconductor layer 755b. The conductive layer 756c serves as one of a source and a drain of the transistor in the pixel circuit.

A conductive layer 756d is electrically connected to the semiconductor layer 755b. The conductive layer 756d serves as the other of the source and the drain of the transistor in the pixel circuit.

A conductive layer 756e is provided over the insulating layer 754. The conductive layer 756e is electrically connected to the gate driver 703b, for example. The conductive layer 756e serves as a terminal electrode. Note that the conductive layers 756a to 756e are formed using the same conductive layer.

An insulating layer 757 is provided over the semiconductor layers 755a and 755b and the conductive layers 756a to 756d. The insulating layer 757 serves as an insulating layer for protecting the transistors (also referred to as a protective insulating layer).

An insulating layer 758 is provided over the insulating layer 757. The insulating layer 758 serves as a planarization layer. The insulating layer 758 can prevent parasitic capacitance from being generated between a conductive layer placed below the insulating layer 758 and a conductive layer placed above the insulating layer 758.

A conductive layer 759a is provided over the insulating layer 758.

The conductive layer 759a overlaps with the semiconductor layer 755a with the insulating layers 757 and 758 provided therebetween. The conductive layer 759a serves as a gate of the transistor in the gate driver 703b. For example, the conductive layer 759a may serve as a back gate of the transistor in the gate driver 703b. For example, in the case of an n-channel transistor, a voltage between the back gate and the source may be a negative voltage. In that case, a threshold voltage of the transistor can be shifted in the positive direction. The conductive layer 759a may be fixed to a constant potential.

A conductive layer 759b is provided over the insulating layer 758. The conductive layer 759b serves as one of a pair of electrodes of a capacitor in the pixel circuit. Note that the conductive layers 759a and 759b are formed using the same conductive layer.

An insulating layer 760 is provided over the insulating layer 758 with the conductive layer 759b provided therebetween. The insulating layer 760 in the region over the transistors in the gate drivers 703a and 703b may be removed, so that hydrogen or water in the insulating layer 758 can be released to the outside, which prevents the insulating layer 758 from being separated from the insulating layer 757. The insulating layer 760 serves as a protective insulating layer. The insulating layer 760 also serves as a dielectric layer of the capacitor in the pixel circuit.

A conductive layer 761 is provided over the insulating layer 760 and electrically connected to the conductive layer 756d through an opening penetrating the insulating layers 757, 758, and 760. Further, the conductive layer 761 overlaps the conductive layer 759b with the insulating layer 760 provided therebetween. The conductive layer 761 serves as one of a pair of electrodes of a liquid crystal element and the other of the pair of electrodes of the capacitor in the pixel circuit.

An insulating layer 762 is provided over the insulating layer 758 or the insulating layer 760 with the conductive layer 761 provided therebetween. The insulating layer 762 serves as an alignment film.

A coloring layer 771 is provided on part of a plane surface of a substrate 704. The coloring layer 771 serves as a color filter.

An insulating layer 772 is provided on the plane surface of the substrate 704 with the coloring layer 771 provided therebetween. The insulating layer 772 serves as a planarization layer.

A conductive layer 773 is provided on a plane surface of the insulating layer 772. The conductive layer 773 serves as the other of the pair of electrodes of the liquid crystal element in the pixel circuit.

An insulating layer 774 is provided on the conductive layer 773. The insulating layer 774 serves as an alignment film.

A sealant 706 is provided between the substrate 701 and the substrate 704 so as to surround the liquid crystal layer 705. The sealant 706 corresponds to the sealant 106 illustrated in FIGS. 1A and 1B, for example.

A sealant 707 is provided so as to surround the sealant 706, close a gap between the substrate 701 and the substrate 704, and extend to a side surface of the substrate 704 and an upper surface or a side surface of the substrate 701. The sealant 707 corresponds to the sealant 107 illustrated in FIGS. 1A and 1B, for example.

A sealant 708 is provided so as to surround the sealant 707. The sealant 708 corresponds to the sealant 108 illustrated in FIGS. 1A and 1B, for example.

A flexible printed board 710 is electrically connected to the conductive layer 756e through a conductive layer 780 and an anisotropic conductive layer 781. The flexible printed board 710 is electrically connected to the gate driver 703a, the gate driver 703b, the source driver 712, and the pixel circuit in the display portion 702, for example.

Figure 12:
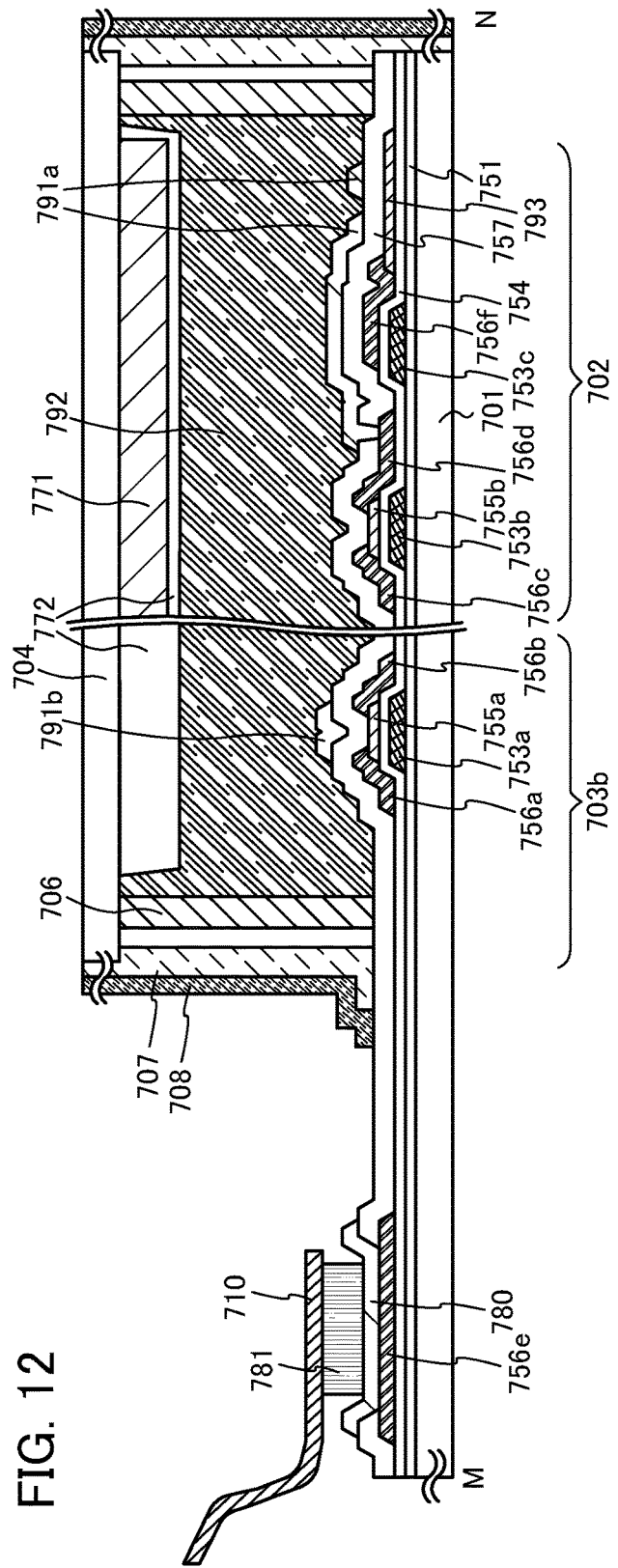
FIG. 12 illustrates a structural example of a liquid crystal display device.

FIG. 12 is a schematic cross-sectional view of a horizontal electric field display device, which differs from the display device illustrated in FIGS. 11A and 11B in not including the insulating layer 758, the insulating layer 760, the insulating layer 762, the conductive layer 773, and the insulating layer 774, additionally including a conductive layer 753c, a conductive layer 793, and a conductive layer 756f, including a conductive layer 791a instead of the conductive layer 761, including a conductive layer 791b instead of the conductive layer 759a, and including a liquid crystal layer 792 instead of the liquid crystal layer 705. For the same portions as those of the display device in FIGS. 11A and 11B, the description of the display device illustrated in FIGS. 11A and 11B can be referred to as appropriate.

The conductive layer 753c is provided over the insulating layer 751. The conductive layer 753c serves as a capacitor line. The conductive layer 753c is formed using the same conductive layer as the conductive layers 753a and 753b.

The conductive layer 793 is provided over the insulating layer 754. The conductive layer 793 serves as one of a pair of electrodes of a capacitor.

The conductive layer 756f is provided over the insulating layer 754 and electrically connected to the conductive layer 753c through an opening penetrating the insulating layer 754. The conductive layer 756f is further electrically connected to the conductive layer 793. The conductive layer 756f serves as a wiring. The conductive layer 756f is formed using the same conductive layer as the conductive layers 756a to 756e.

The conductive layer 791a is provided over the insulating layer 757 and electrically connected to the conductive layer 756d through an opening penetrating the insulating layer 757. The conductive layer 791a has a comb-shaped portion; each of teeth of the comb-shaped portion overlaps with the conductive layer 793 with the insulating layer 757 provided therebetween. The conductive layer 791a serves as one of the pair of electrodes of the liquid crystal element in the pixel circuit. Further, the conductive layer 791a serves as the other of the pair of electrodes of the capacitor in the pixel circuit. The conductive layer 793 serves as the other of the pair of electrodes of the liquid crystal element in the pixel circuit.

The conductive layer 791b is provided over the insulating layer 757 and overlaps with the semiconductor layer 755a with the insulating layer 757 provided therebetween. The conductive layer 791b serves as a gate of the transistor in the gate driver 703b. For example, the conductive layer 791b may serve as a back gate of the transistor in the gate driver 703b. For example, in the case of an n-channel transistor, a voltage between the back gate and the source may be a negative voltage. In that case, a threshold voltage of the transistor can be shifted in the positive direction. The conductive layer 791b may be fixed to a constant potential.

The liquid crystal layer 792 is surrounded by the sealant 706 and provided over the conductive layers 791a and 793.

Note that an insulating layer serving as a protective layer may be provided over the insulating layer 757 with the conductive layers 791a and 791b provided therebetween. An insulating layer serving as a protective layer may be provided on the insulating layer 772. The protective layer may also serve as an alignment film.

Note that although the transistors in FIGS. 11A and 11B and FIG. 12 are of channel-etched type, without being limited to this type, they may be of channel-protection type or top-gate type.

Next, components of the display devices illustrated in FIGS. 11A and 11B and FIG. 12 are described. Note that each layer may have a stacked-layer structure.

As the substrates 701 and 704, glass substrates can be used, for example. As the glass substrate, for example, an alkali-free glass substrate of barium borosilicate glass, aluminoborosilicate glass, aluminosilicate glass, or the like may be used.

The insulating layer 751 can be, for example, a layer containing a material such as silicon oxide, silicon nitride, silicon oxynitride, silicon nitride oxide, aluminum oxide, aluminum nitride, aluminum oxynitride, aluminum nitride oxide, or hafnium oxide. The insulating layer 751 is preferably capable of suppressing entry of impurities from the substrate 701. Note that the insulating layer 751 is not necessarily provided.

The conductive layers 753a to 753c can be formed using a layer containing a metal material such as molybdenum, titanium, chromium, tantalum, magnesium, silver, tungsten, aluminum, copper, neodymium, or scandium, for example.

Each of the insulating layers 754 and 757 can be, for example, a layer containing a material such as silicon oxide, silicon nitride, silicon oxynitride, silicon nitride oxide, aluminum oxide, aluminum nitride, gallium oxide, gallium oxynitride, yttrium oxide, yttrium oxynitride, aluminum oxynitride, aluminum nitride oxide, or hafnium oxide. The insulating layer 754 may be an oxide layer. The oxide layer may be a layer of an oxide having an atomic ratio of In:Ga:Zn=1:3:2.

Note that in order that an oxide semiconductor layer is supersaturated with oxygen, insulating layers in contact with the oxide semiconductor layer (the insulating layers 754 and 757) each preferably include a layer containing excess oxygen.

As the insulating layer containing excess oxygen, a silicon oxide film or a silicon oxynitride film containing a large amount of oxygen as a result of film formation by a plasma CVD method or a sputtering method under the conditions which are set as appropriate is used. Oxygen may be added by an ion implantation method, an ion doping method, or plasma treatment.

In addition, blocking layers against oxygen, hydrogen, or water are preferably provided as the insulating layers 754 and 757 outside the insulating layers containing excess oxygen. Accordingly, diffusion of oxygen contained in the oxide semiconductor layer to the outside and entry of hydrogen, water, or the like into the oxide semiconductor layer from the outside can be prevented. The blocking layers can be, for example, layers containing a material such as silicon nitride, aluminum oxide, aluminum nitride, gallium oxide, gallium oxynitride, yttrium oxide, yttrium oxynitride, aluminum oxynitride, aluminum nitride oxide, or hafnium oxide or the like.

In the case where the oxide semiconductor layer is surrounded by the insulating layers containing excessive oxygen or the blocking layers, the oxide semiconductor layer can contain oxygen in a proportion which is substantially the same as that in the stoichiometric composition, or in a supersaturated state in which oxygen exceeding the stoichiometric composition is contained.

For example, the insulating layer 754 may be formed by a stack of a first silicon nitride layer, a second silicon nitride layer, and a silicon oxynitride layer. In that case, it is preferable that the first silicon nitride layer have fewer defects than the second silicon nitride layer. It is also preferable that less hydrogen and less ammonia be released from the second silicon nitride layer than from the first silicon nitride layer.

For example, the insulating layer 757 may be formed by a stack of a first silicon oxynitride layer, a second silicon oxynitride layer, and a silicon nitride layer. In that case, it is preferable that the second silicon oxynitride layer contains more oxygen than the first silicon oxynitride layer. It is also preferable that the silicon nitride layer have a higher oxygen, hydrogen, or water blocking property than the first silicon oxynitride layer and the second silicon oxynitride layer.

As the semiconductor layers 755*a* and 755*b*, oxide semiconductor layers can be used, for example.

For example, an In-based metal oxide, a Zn-based metal oxide, an In—Zn-based metal oxide, or an In—Ga—Zn-based metal oxide can be used as the oxide semiconductor. Furthermore, a metal oxide including another metal element instead of part or all of Ga in the In—Ga—Zn-based metal oxide may be used.

The oxide semiconductor may include a crystal. For example, the oxide semiconductor may be polycrystalline or single-crystal. Alternatively, the oxide semiconductor may be amorphous.

As the metal element included instead of part or all of Ga, a metal element that is capable of combining with more oxygen atoms than gallium can be used, for example, and specifically one or more elements of titanium, zirconium, hafnium, germanium, and tin can be used, for instance. Alternatively, as the metal element, one or more elements of lanthanum, cerium, praseodymium, neodymium, samarium, europium, gadolinium, terbium, dysprosium, holmium, erbium, thulium, ytterbium, and lutetium may be used. These metal elements function as a stabilizer. Note that the amount of such a metal element added is determined so that the metal oxide can function as a semiconductor. When a metal element that is capable of combining with more oxygen atoms than gallium is used and oxygen is supplied to the metal oxide, oxygen vacancies in the metal oxide can be reduced.

Further, the semiconductor layers 755*a* and 755*b* may each have a stacked layer structure including a first oxide semiconductor layer with an atomic ratio of In:Ga:Zn=1:1:1, a second oxide semiconductor layer with an atomic ratio of In:Ga:Zn=3:1:2, and a third oxide semiconductor layer with an atomic ratio of In:Ga:Zn=1:1:1. By employing this stacked layer structure for the semiconductor layers 755*a* and 755*b*, the transistors can have buried channels and high electric field mobility, for example.

The transistor containing the oxide semiconductor has low leakage current due to thermal excitation because of its wide bandgap. Further, the effective mass of a hole is large, which is 10 or more, and the height of the tunnel barrier is high, which is 2.8 eV or higher. Thus, the amount of tunnel current is small. Furthermore, the number of carriers in the semiconductor layer is very small; therefore, the off-state current can be made low. For example, the off-state current per micrometer of the channel width at room temperature (25° C.) is lower than or equal to $1\times10^{-19}$ A (100 zA), preferably lower than or equal to $1\times10^{-22}$ A (100 yA). It is preferable that the off-state current of the transistor be as low as possible; the lowest value of the off-state current of the transistor is estimated to be about $1\times10^{-30}$ A/μm. The semiconductor layers 755*a* and 755*b* are each not limited to the above-described oxide semiconductor layer and may be a semiconductor layer including a Group 14 element (e.g., silicon). For example, as the semiconductor layer including silicon, a single-crystal silicon layer, a polycrystalline silicon layer, an amorphous silicon layer, or the like can be used.

The transistor including the oxide semiconductor can be fabricated in such a manner that, for example, impurities such as hydrogen or water are reduced as much as possible and oxygen vacancies are reduced as much as possible by supply of oxygen. At this time, the amount of hydrogen regarded as a donor impurity in the channel formation region is preferred to be lower than or equal to $1\times10^{19}/cm^3$, further preferably lower than or equal to $1\times10^{18}/cm^3$ when measured by secondary ion mass spectrometry (SIMS).

For example, a layer containing oxygen is used as the layer in contact with the oxide semiconductor layer, and heat treatment is performed; thus, the oxide semiconductor layer can be highly purified.

In addition, the oxide semiconductor layer just after its formation is preferably supersaturated with oxygen so that the proportion of oxygen is higher than that in the stoichiometric composition. For example, in the case of using sputtering, the oxide semiconductor layer is preferably formed under the condition where the proportion of oxygen in a deposition gas is high, and particularly in an oxygen atmosphere (e.g., oxygen gas: 100%).

In a sputtering apparatus, the amount of moisture remaining in a deposition chamber is preferably small. Therefore, an entrapment vacuum pump is preferably used in the sputtering apparatus. Further, a cold trap may be used.

For formation of the oxide semiconductor layer, heat treatment is preferably performed. The temperature of the heat treatment is preferably higher than or equal to 150° C. and lower than the strain point of the substrate, more preferably higher than or equal to 300° C. and lower than or equal to 450° C. Note that the heat treatment may be performed more than once.

A rapid thermal annealing (RTA) apparatus such as a gas rapid thermal annealing (GRTA) apparatus or a lamp rapid thermal annealing (LRTA) apparatus can be used as a heat treatment apparatus for the heat treatment. Alternatively, another heat treatment apparatus such as an electric furnace may be used.

After the heat treatment, a high-purity oxygen gas, a high-purity $N_2O$ gas, or ultra-dry air (having a dew point of −40° C. or lower, preferably −60° C. or lower) is preferably introduced in the furnace where the heat treatment has been performed while the heating temperature is being maintained or being decreased. In that case, it is preferable that the oxygen gas or the $N_2O$ gas do not contain water, hydrogen, and the like. The purity of the oxygen gas or the $N_2O$ gas which is introduced into the heat treatment apparatus is preferably 6N or higher, more preferably 7N or higher. That is, the impurity concentration of the oxygen gas or the $N_2O$ gas is preferably 1 ppm or lower, more preferably 0.1 ppm or lower. Through this step, oxygen is supplied to the oxide semiconductor layer, and defects due to oxygen vacancies in the oxide semiconductor layer can be reduced. Note that the introduction of the high-purity oxygen gas, the high-purity $N_2O$ gas, or the ultra-dry air may be performed at the time of the above heat treatment.

With the use of the highly purified oxide semiconductor layer for the field-effect transistor, the carrier density of the oxide semiconductor layer can be lower than $1\times10^{14}/cm^3$, preferably lower than $1\times10^{12}/cm^3$, further preferably lower than $1\times10^{11}/cm^3$. Such a low carrier density can reduce the off-state current of the field-effect transistor per micrometer of the channel width to $1\times10^{-19}$ A (100 zA) or less, preferably $1\times10^{-22}$ A (100 yA) or less. It is preferable that the off-state current of the field-effect transistor be as low as possible; the lowest value of the off-state current of the field-effect transistor is estimated to be approximately $1\times10^{-30}$ A/μm.

Note that the oxide semiconductor may be a CAAC-OS.

For example, the oxide semiconductor layer that is a CAAC-OS can be formed by a sputtering method. In that case, the sputtering is performed using a polycrystalline oxide semiconductor sputtering target. When ions collide with the sputtering target, a crystal region included in the sputtering target may be separated from the target along an a-b plane; in other words, a sputtered particle having a plane parallel to an a-b plane (flat-plate-like sputtered particle or pellet-like sputtered particle) may flake off from the sputtering target. In that case, the sputtered particle reaches a substrate while maintaining its crystal state, whereby a crystal state of the sputtering target is transferred to a substrate. In this manner, the CAAC-OS is formed.

For the deposition of the CAAC-OS, the following conditions are preferably used.

For example, the CAAC-OS is formed while the impurity concentration is reduced, whereby the crystal state of the oxide semiconductor can be prevented from being broken by the impurities. For example, impurities (e.g., hydrogen, water, carbon dioxide, and nitrogen) existing in a deposition chamber of a sputtering apparatus are preferably reduced. Further, impurities in a deposition gas are preferably reduced. For example, a deposition gas whose dew point is −80° C. or lower, preferably −100° C. or lower is preferably used as a deposition gas.

It is preferable that the temperature of the substrate at the time of deposition be high. In the case of high substrate temperature, when the flat-plate-like sputtered particle reaches the substrate, migration of the sputtered particle occurs, so that a flat plane of the sputtered particle can be attached to the substrate. For example, an oxide semiconductor film is deposited at a substrate heating temperature of higher than or equal to 100° C. and lower than or equal to 740° C., preferably higher than or equal to 200° C. and lower than or equal to 500° C., whereby the oxide semiconductor layer is formed.

Further, it is preferable to suppress plasma damage at the time of deposition by increasing the oxygen percentage in the deposition gas and optimizing electric power. For example, the oxygen percentage in the deposition gas is preferably 30 vol % or higher, still preferably 100 vol %.

The conductive layers 756a to 756f and 780 can be formed using a layer containing a metal material such as molybdenum, titanium, chromium, tantalum, magnesium, silver, tungsten, aluminum, copper, neodymium, scandium, or ruthenium, for example. For example, the conductive layers 756a to 756f may be formed by a stack of a tungsten layer, an aluminum layer, and a titanium layer.

The insulating layer 758 can be, for example, a layer of an organic insulating material or an inorganic insulating material. For example, the insulating layer 758 may be formed using an acrylic resin or the like.

As the conductive layers 759a and 759b, a layer of a metal oxide that functions as a conductor and transmits light or the like can be used, for example. For example, indium zinc oxide, indium tin oxide, or the like can be used.

The insulating layers 760, 762, and 774 can be formed using a material which can be used for the insulating layer 754, for example. The insulating layer 762 can be formed using a silicon nitride layer, for example.

As the conductive layers 761 and 773, a layer of a metal oxide that transmits light or the like can be used, for example. For example, indium zinc oxide, indium tin oxide, or the like can be used.

The coloring layer 771 has a function of transmitting light of one of red (R), green (G), and blue (B), for example. As the coloring layer 771, for example, a layer including a dye or a pigment can be used.

The insulating layer 772 can be, for example, a layer of an organic insulating material or an inorganic insulating material.

As the liquid crystal layer 705, a layer including TN liquid crystal, OCB liquid crystal, STN liquid crystal, VA liquid crystal, ECB liquid crystal, GH liquid crystal, polymer dispersed liquid crystal, or discotic liquid crystal can be used, for example.

As the liquid crystal layer 792, a layer including a liquid crystal exhibiting a blue phase can be used, for example. Note that as long as orientation can be controlled, a layer including another liquid crystal which can be used for the liquid crystal layer 705 may be used in a horizontal electric field mode, for example.

The layer including the liquid crystal exhibiting a blue phase contains a liquid crystal composition including the liquid crystal exhibiting a blue phase, a chiral material, a liquid-crystalline monomer, a non-liquid-crystalline monomer, and a polymerization initiator. The liquid crystal exhibiting a blue phase has a short response time and is optically isotropic; therefore, alignment treatment is not necessary and the viewing angle dependence is small. Therefore, with the liquid crystal exhibiting a blue phase, the operation speed of the liquid crystal display device can be increased.

For the conductive layer 793, a light-transmitting conductive material can be used, and for example, a layer of a light-transmitting metal oxide or the like can be used. For example, indium zinc oxide, indium tin oxide, or the like can be used. Note that the conductive layer 793 may be formed by changing a semiconductor layer, which is formed using the same layer as the semiconductor layers 755a and 755b, into an n-type. For example, a semiconductor layer can be changed into an n-type by increasing oxygen vacancies in, or adding an element imparting n-type conductivity to, a semiconductor layer formed using the same layer as the semiconductor layers 755a and 755b.

For the sealant 706, a material similar to that of the sealant 106 described in Embodiment 1 can be used. The sealant 706 can be formed by a method similar to that used for the sealant 106 described in Embodiment 1.

For the sealant 707, a material similar to that of the sealant 107 described in Embodiment 1 can be used. The sealant 707 can be formed by a method similar to that used for the sealant 107 described in Embodiment 1.

For the sealant 708, a material similar to that of the sealant 108 described in Embodiment 1 can be used. The sealant 708 can be formed by a method similar to that used for the sealant 108 described in Embodiment 1.

The above is the description of the structural examples of the liquid crystal display devices illustrated in FIGS. 11A and 11B and FIG. 12.

As described with reference to FIGS. 11A and 11B and FIG. 12, one example of the liquid crystal display device according to this embodiment includes a pixel circuit in a display portion, and the pixel circuit includes a liquid crystal element, a transistor, and a capacitor. In addition, as the transistor, a transistor having a channel formation region in an oxide semiconductor is used. Further, a first sealant which has a function of sealing a liquid crystal layer between two substrates is provided, and a second sealant which closes a gap between the first substrate and the second substrate and extends to at least a side surface of the second substrate is provided.

As described with reference to FIGS. 11A and 11B and FIG. 12, in one example of the liquid crystal display device according to this embodiment, a transistor having a channel formation region in an oxide semiconductor is used as the transistor. Further, the first sealant which has a function of sealing the liquid crystal layer between the two substrates is provided, and the second sealant which closes a gap between the first substrate and the second substrate and extends to at least a side surface of the second substrate is provided.

In a transistor in which a channel is formed in an oxide semiconductor, if water or the like enters the semiconductor layer, it partly serves as a donor and may cause degradation of electrical characteristics such as an increase in off-state current or may cause a change in electrical characteristics such as a shift of the threshold voltage in the negative direction. However, the second sealant can suppress entry of impurities such as water from the outside; thus, degradation and changes of electrical characteristics of the transistor can be suppressed. Accordingly, the reliability of the liquid crystal display device can be improved. In addition, when a third sealant is further provided so as to surround the second sealant, the effect of suppressing entry of the impurities can be enhanced.

In one example of the display device according to this embodiment, the second sealant is provided so as to close the gap between the first substrate and the second substrate and extend to at least the side surface of the second substrate, after the first substrate and the second substrate are attached to each other. Accordingly, a narrower frame can be obtained than in the case where the first substrate and the second substrate are attached to each other after the second sealant is formed over the first substrate.

Further, in the example of the liquid crystal display device according to this embodiment, a driver circuit such as a gate driver is provided over the same substrate as the pixel circuit. Thus, the number of wirings for connecting the pixel circuit and the driver circuit can be reduced.

Embodiment 3

In this embodiment, examples of electronic devices each provided with a panel including a display device are described with reference to FIGS. 13A to 13D.

Figure 13A:
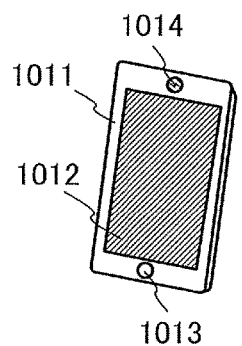
FIGS. 13A to 13D each illustrate an example of an electronic device.

An electronic device in FIG. 13A is an example of a portable information terminal.

The electronic device illustrated in FIG. 13A includes a housing 1011 which is provided with a panel 1012, a button 1013, and a speaker 1014.

Note that the housing 1011 may be provided with a connection terminal for connecting the electronic device to an external device and a button for operating the electronic device.

The panel 1012 may be formed using the display device in Embodiment 1 or 2.

The panel 1012 may be a touch panel, in which case touch detection can be performed on the panel 1012. As the touch panel, an optical touch panel, a capacitive touch panel, a resistive touch panel, or the like can be used, for example.

The button 1013 is provided on the housing 1011. When the button 1013 is a power button, for example, the electronic device can be turned on or off by pressing the button 1013.

The speaker 1014 is provided on the housing 1011. The speaker 1014 outputs sound.

Note that the housing 1011 may be provided with a microphone, in which case the electronic device in FIG. 13A can function as a telephone, for example.

The electronic device illustrated in FIG. 13A functions as at least one of a telephone, an e-book reader, a personal computer, and a game machine, for example.

Figure 13B:
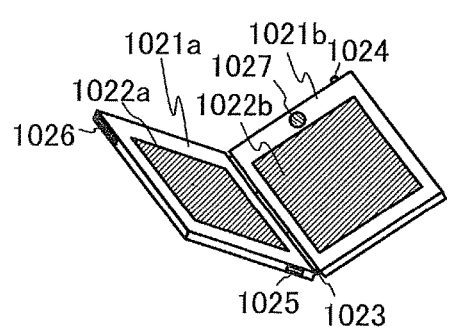

An electronic device illustrated in FIG. 13B is an example of a foldable information terminal.

The electronic device illustrated in FIG. 13B has a housing 1021a provided with a panel 1022a, a housing 1021b provided with a panel 1022b, a hinge 1023, a button 1024, a connection terminal 1025, a recording media inserting portion 1026, and a speaker 1027.

The housing 1021a and the housing 1021b are connected by the hinge 1023.

The panels 1022a and 1022b may be formed using the display device in Embodiment 1 or 2.

The panels 1022a and 1022b may be touch panels, in which case touch detection can be performed on the panels 1022a and 1022b. As the touch panel, an optical touch panel, a capacitive touch panel, a resistive touch panel, or the like can be used, for example.

Since the electronic device in FIG. 13B includes the hinge 1023, it can be folded so that the panels 1022a and 1022b face each other.

The button 1024 is provided on the housing 1021b. Note that the button 1024 may be provided on the housing 1021a. For example, when the button 1024 is a power button, for example, the electronic device can be turned on or off by pressing the button 1024.

The connection terminal 1025 is provided on the housing 1021a. Note that the connection terminal 1025 may be provided on the housing 1021b. Alternatively, a plurality of connection terminals 1025 may be provided on one or both of the housings 1021a and 1021b. The connection terminal 1025 is a terminal for connecting the electronic device illustrated in FIG. 13B to another device.

The recording media inserting portion 1026 is provided on the housing 1021a. The recording media inserting portion 1026 may be provided on the housing 1021b. Alternatively, a plurality of recording media inserting portions 1026 may be provided on one or both of the housings 1021a and 1021b. For example, a card-type recording medium is inserted into the recording media inserting portion so that data can be read to the electronic device from the card-type recording medium or data stored in the electronic device can be written to the card-type recording medium.

The speaker 1027 is provided on the housing 1021b. The speaker 1027 outputs sound. Note that the speaker 1027 may be provided on the housing 1021a.

Note that the housing 1021a or the housing 1021b may be provided with a microphone, in which case the electronic device in FIG. 13B can function as a telephone, for example.

The electronic device illustrated in FIG. 13B functions as at least one of a telephone, an e-book reader, a personal computer, and a game machine, for example.

Figure 13C:
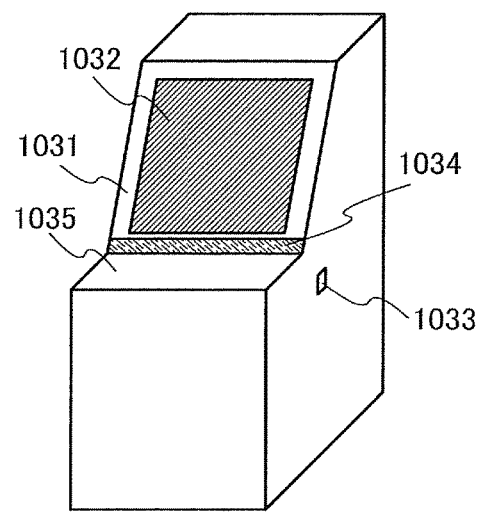

An electronic device illustrated in FIG. 13C is an example of a stationary information terminal. The electronic device illustrated in FIG. 13C has a housing 1031 which is provided with a panel 1032, a button 1033, and a speaker 1034.

The panel 1032 may be formed using the display device in Embodiment 1 or 2.

The panel 1032 may be a touch panel, in which case touch detection can be performed on the panel 1032. As the touch panel, an optical touch panel, a capacitive touch panel, a resistive touch panel, or the like can be used, for example.

Note that a panel similar to the panel 1032 may be provided on a top board 1035 of the housing 1031.

Further, the housing 1031 may be provided with a ticket slot for issuing a ticket or the like, a coin slot, a bill slot, and/or the like.

The button 1033 is provided on the housing 1031. For example, when the button 1033 is a power button, for example, the electronic device can be turned on or off by pressing the button 1033.

The speaker 1034 is provided on the housing 1031. The speaker 1034 outputs sound.

The electronic device in FIG. 13C serves as an automated teller machine, an information communication terminal (also referred to as multimedia station) for ordering a ticket or the like, or a game machine, for example.

Figure 13D:
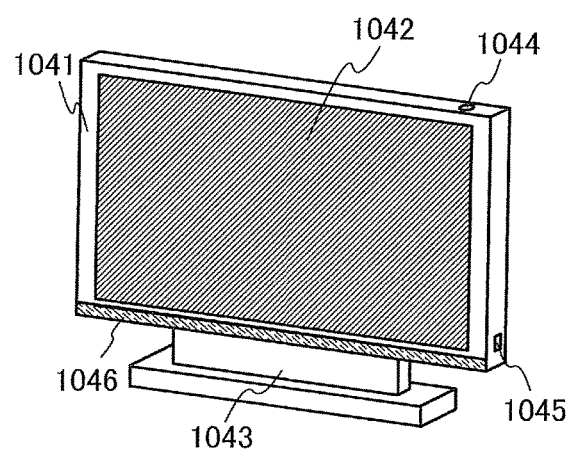

FIG. 13D illustrates an example of a stationary information terminal. The electronic device in FIG. 13D has a housing 1041 provided with a panel 1042, a support 1043 for supporting the housing 1041, a button 1044, a connection terminal 1045, and a speaker 1046.

Note that the housing 1041 may be provided with another connection terminal for connecting the electronic device to an external device.

The panel 1042 may be formed using the display device in Embodiment 1 or 2.

The panel 1042 may be a touch panel, in which case touch detection can be performed on the panel 1042. As the touch panel, an optical touch panel, a capacitive touch panel, a resistive touch panel, or the like can be used, for example.

The button 1044 is provided on the housing 1041. For example, when the button 1044 is a power button, the electronic device can be turned on or off by pressing the button 1044.

The connection terminal 1045 is provided on the housing 1041. The connection terminal 1045 is a terminal for connecting the electronic device in FIG. 13D to another device. For example, when the electronic device in FIG. 13D and a personal computer are connected with the connection terminal 1045, the panel 1042 can display an image corresponding to a data signal input from the personal computer. For example, when the panel 1042 of the electronic device in FIG. 13D is larger than a panel of another electronic device connected thereto, a displayed image of the other electronic device can be enlarged, so that a plurality of viewers can easily see the image at the same time.

The speaker 1046 is provided on the housing 1041. The speaker 1046 outputs sound.

The electronic device in FIG. 13D functions as at least one of an output monitor, a personal computer, and a television set, for example.

The above is the description of the electronic devices illustrated in FIGS. 13A to 13D.

When the display device in Embodiment 1 or 2 is used in a panel of an electronic device of this embodiment as described with reference to FIGS. 13A to 13D, the electronic device can have high reliability.

This application is based on Japanese Patent Application serial no. 2012-188060 filed with Japan Patent Office on Aug. 28, 2012, the entire contents of which are hereby incorporated by reference.

What is claimed is:

1. A display device comprising:
  a first substrate;
  a second substrate overlapping with the first substrate;
  a liquid crystal layer between the first substrate and the second substrate;
  a transistor between the first substrate and the second substrate, the transistor including a channel formation region containing an oxide semiconductor;
  a first sealant between the first substrate and the second substrate, the first sealant surrounding and enclosing the liquid crystal layer so as to seal the liquid crystal layer and the transistor;
  a second sealant surrounding and enclosing the first sealant so as to seal the liquid crystal layer and the transistor; and
  a third sealant surrounding and enclosing the second sealant so as to seal the liquid crystal layer and the transistor,
  wherein the second sealant closes a gap between the first substrate and the second substrate, and
  wherein the second sealant extends to at least a side surface of the second substrate.

2. The display device according to claim 1,
  wherein the first sealant comprises an epoxy resin or an acrylic resin.

3. The display device according to claim 1,
  wherein the second sealant comprises a frit glass.

4. The display device according to claim 1,
  wherein the third sealant comprises any one of aluminum, copper, lead, and nickel.

5. An electronic device comprising a panel including the display device according to claim 1.

6. The display device according to claim 1,
  wherein a moisture permeability of the second sealant is lower than a moisture permeability of the first sealant.

7. The display device according to claim 1,
  wherein a moisture permeability of the second sealant is lower than a moisture permeability of the first sealant, and
  wherein a moisture permeability of the third sealant is lower than the moisture permeability of the second sealant.

8. The display device according to claim 1,
  wherein the first sealant and the second sealant are apart from each other.

9. The display device according to claim 1,
  wherein a moisture permeability of the second sealant is lower than a moisture permeability of the first sealant,
  wherein a moisture permeability of the third sealant is lower than the moisture permeability of the second sealant, and
  wherein the first sealant and the second sealant are apart from each other.

10. A display device comprising:
a first substrate;
a second substrate overlapping with the first substrate;
a liquid crystal layer between the first substrate and the second substrate;
a transistor between the first substrate and the second substrate, the transistor including a channel formation region containing an oxide semiconductor;
a first sealant between the first substrate and the second substrate, the first sealant surrounding and enclosing the liquid crystal layer so as to seal the liquid crystal layer and the transistor;
a second sealant surrounding and enclosing the first sealant so as to seal the liquid crystal layer and the transistor; and
a third sealant surrounding and enclosing the second sealant so as to seal the liquid crystal layer and the transistor,
wherein the second sealant closes a gap between the first substrate and the second substrate,
wherein the first sealant is in direct contact with the liquid crystal layer,
wherein the second sealant is in direct contact with a first side surface of the first substrate, a first side surface of the second substrate and a second side surface of the second substrate,
wherein the second sealant is not in direct contact with a second side surface of the first substrate,
wherein the first side surface of the first substrate and the first side surface of the second substrate face a first direction,
wherein the second side surface of the first substrate and the second side surface of the second substrate face a second direction, and
wherein the third sealant is in direct contact with the second sealant.

11. The display device according to claim 10,
wherein the first sealant comprises an epoxy resin or an acrylic resin.

12. The display device according to claim 10,
wherein the second sealant comprises a frit glass.

13. The display device according to claim 10,
wherein the third sealant comprises any one of aluminum, copper, lead, and nickel.

14. An electronic device comprising a panel including the display device according to claim 10.

15. The display device according to claim 10,
wherein a moisture permeability of the second sealant is lower than a moisture permeability of the first sealant.

16. The display device according to claim 10,
wherein a moisture permeability of the second sealant is lower than a moisture permeability of the first sealant, and
wherein a moisture permeability of the third sealant is lower than the moisture permeability of the second sealant.

17. The display device according to claim 10,
wherein the first sealant and the second sealant are apart from each other.

18. The display device according to claim 10,
wherein a moisture permeability of the second sealant is lower than a moisture permeability of the first sealant,
wherein a moisture permeability of the third sealant is lower than the moisture permeability of the second sealant, and
wherein the first sealant and the second sealant are apart from each other.

19. The display device according to claim 1,
wherein a hydrogen concentration in the channel formation region is lower than or equal to $1\times10^{19}/cm^3$ when measured by secondary ion mass spectrometry.

20. The display device according to claim 10,
wherein a hydrogen concentration in the channel formation region is lower than or equal to $1\times10^{19}/cm^3$ when measured by secondary ion mass spectrometry.

* * * * *

UNITED STATES PATENT AND TRADEMARK OFFICE
CERTIFICATE OF CORRECTION

PATENT NO. : 9,625,764 B2
APPLICATION NO. : 13/965239
DATED : April 18, 2017
INVENTOR(S) : Shunpei Yamazaki et al.

It is certified that error appears in the above-identified patent and that said Letters Patent is hereby corrected as shown below:

On the Title Page

On page 2, References Cited, the 37$^{th}$ reference, "7,738,062 B2 6/2010 Tashiro et al." should be deleted.

Signed and Sealed this
Thirtieth Day of May, 2017

Michelle K. Lee
*Director of the United States Patent and Trademark Office*